US007697046B2

(12) United States Patent
Nagakura

(10) Patent No.: US 7,697,046 B2
(45) Date of Patent: Apr. 13, 2010

(54) IMAGE SIGNAL PROCESSING DEVICE AND METHOD OF IMAGE SIGNAL PROCESSING INCLUDING PIXEL ARRAY PATTERN DETERMINATION

(75) Inventor: Naoko Nagakura, Saitama (JP)

(73) Assignee: HOYA Corporation, Tokyo (JP)

( * ) Notice: Subject to any disclaimer, the term of this patent is extended or adjusted under 35 U.S.C. 154(b) by 522 days.

(21) Appl. No.: 11/567,358

(22) Filed: Dec. 6, 2006

(65) Prior Publication Data

US 2007/0126897 A1 Jun. 7, 2007

(30) Foreign Application Priority Data

Dec. 7, 2005 (JP) .............................. 2005-353965

(51) Int. Cl.
*H04N 9/07* (2006.01)
*A61B 1/05* (2006.01)

(52) U.S. Cl. ......................................... 348/280; 348/71

(58) Field of Classification Search ................. 348/279, 348/266, 272, 273, 278, 280, 275; 382/162, 382/167, 300

See application file for complete search history.

(56) References Cited

U.S. PATENT DOCUMENTS

| | | | |
|---|---|---|---|
| 3,971,065 A | | 7/1976 | Bayer |
| 4,670,777 A | | 6/1987 | Ishikawa et al. |
| 6,133,953 A | | 10/2000 | Okada |
| 2002/0041332 A1* | | 4/2002 | Murata et al. ............... 348/272 |
| 2002/0113195 A1* | | 8/2002 | Osada ...................... 250/208.1 |
| 2004/0161145 A1* | | 8/2004 | Embler ........................ 382/165 |
| 2006/0104505 A1* | | 5/2006 | Chen et al. .................. 382/162 |
| 2007/0013786 A1* | | 1/2007 | Chiba et al. .............. 348/222.1 |

FOREIGN PATENT DOCUMENTS

| JP | 51-112228 | 10/1976 |
|---|---|---|
| JP | 6-028450 | 4/1994 |
| JP | 10-234047 | 9/1998 |

OTHER PUBLICATIONS

Tang, Bei and Lee, King F., "An Efficient Color Image Acquisition System for Wireless Handheld Devices", IEEE International Conference on Acoustics, Speech, and Signal Processing, May 17, 2004, vol. 3, pp. 105-108.*
English Language Abstract of JP 10-234047.

* cited by examiner

*Primary Examiner*—Jason Whipkey
(74) *Attorney, Agent, or Firm*—Greenblum & Bernstein PLC

(57) ABSTRACT

A device, for processing each pixel signal output from a solid-state imaging device, has a determination processor and an interpolation processor. Each pixel is defined as a center pixel of a k×k matrix. The interpolation processor presumes which pixels have the same color as one another in the k×k matrix, according to the plurality of pixel-array patterns, and conducts a pixel interpolation in each case of presumed color arrangement according to the plurality of pixel-array patterns, so as to generate signal groups of presumed interpolation signals of the center pixel. The determination processor determines a pixel-array pattern in the k×k matrix to be a pattern selected from the plurality of pixel-array patterns. One of the signal groups that is generated according to the determined pixel-array pattern is selected as interpolation signals of the center pixel.

19 Claims, 22 Drawing Sheets

FIG. 2

| A | B | A | B | ............... | B |
|---|---|---|---|---|---|
| C | D | C | D | ............... | D |
| B | A | B | A |  | A |
| C | D | C | D |  | D |
| A | B | A | B |  | B |
| ⋮ | ⋮ |  |  |  |  |
| C | D | C | D |  | D |

α (indicates second column at top)

FIG. 3

| α | | | | | |
|---|---|---|---|---|---|
| $P_{11}$ | $P_{12}$ | $P_{13}$ | $P_{14}$ | ⋯⋯⋯⋯⋯⋯ | $P_{1n}$ |
| $P_{21}$ | $P_{22}$ | $P_{23}$ | $P_{24}$ | ⋯⋯⋯⋯⋯⋯ | $P_{2n}$ |
| $P_{31}$ | $P_{32}$ | $P_{33}$ | $P_{34}$ | | $P_{3n}$ |
| $P_{41}$ | $P_{42}$ | $P_{43}$ | $P_{44}$ | | $P_{4n}$ |
| $P_{51}$ | $P_{52}$ | $P_{53}$ | $P_{54}$ | | $P_{5n}$ |
| ⋮ | ⋮ | | | | |
| $P_{m1}$ | $P_{m2}$ | $P_{m3}$ | $P_{m4}$ | | $P_{mn}$ |

FIRST OPERATOR
(VERTICAL DIRECTION)

SECOND OPERATOR
(HORIZONTAL DIRECTION)

THIRD OPERATOR
(LEFT-DIAGONAL DIRECTION)

FOURTH OPERATOR
(RIGHT-DIAGONAL DIRECTION)

FIFTH OPERATOR
(VERTICAL DIRECTION)

SIXTH OPERATOR
(HORIZONTAL DIRECTION)

SEVENTH OPERATOR
(LEFT-DIAGONAL DIRECTION)

EIGHTH OPERATOR
(RIGHT-DIAGONAL DIRECTION)

FIG. 13

FIRST COEFFICIENT
MATRIX (Y1)
(VERTICAL DIRECTION)

| 0 | 1 | 2 | 1 | 0 |
|---|---|---|---|---|
| 0 | 1 | 2 | 1 | 0 |
| 0 | 2 | 4 | 2 | 0 |
| 0 | 1 | 2 | 1 | 0 |
| 0 | 1 | 2 | 1 | 0 |

SECOND COEFFICIENT
MATRIX (Y2)
(HORIZONTAL DIRECTION)

| 0 | 0 | 0 | 0 | 0 |
|---|---|---|---|---|
| 1 | 1 | 2 | 1 | 1 |
| 2 | 2 | 4 | 2 | 2 |
| 1 | 1 | 2 | 1 | 1 |
| 0 | 0 | 0 | 0 | 0 |

THIRD COEFFICIENT
MATRIX (Y3)
(LEFT-DIAGONAL DIRECTION)

| 2 | 1 | 1 | 0 | 0 |
|---|---|---|---|---|
| 1 | 2 | 2 | 1 | 0 |
| 1 | 2 | 4 | 2 | 1 |
| 0 | 1 | 2 | 2 | 1 |
| 0 | 0 | 1 | 1 | 2 |

FOURTH COEFFICIENT
MATRIX (Y4)
(RIGHT-DIAGONAL DIRECTION)

| 0 | 0 | 1 | 1 | 2 |
|---|---|---|---|---|
| 0 | 1 | 2 | 2 | 1 |
| 1 | 2 | 4 | 2 | 1 |
| 1 | 2 | 2 | 1 | 0 |
| 2 | 1 | 1 | 0 | 0 |

FIFTH COEFFICIENT
MATRIX (Y5)
(NO DIRECTION)

| 0 | 1 | 1 | 1 | 0 |
|---|---|---|---|---|
| 1 | 2 | 2 | 2 | 1 |
| 1 | 2 | 4 | 2 | 1 |
| 1 | 2 | 2 | 2 | 1 |
| 0 | 1 | 1 | 1 | 0 |

| A | B | A | B | ·················· | B |
|---|---|---|---|---|---|
| C | D | C | D | ·················· | D |
| B | C | B | C |   | A |
| D | A | D | A |   | A |
| A | B | A | B |   | B |
| ⋮ | ⋮ |   |   |   |   |
| D | A | D | A |   | A |

FIRST-ARRAY PATTERN(A)

SECOND-ARRAY PATTERN(B)

THIRD-ARRAY PATTERN(C)

FOURTH-ARRAY PATTERN(D)

FIG. 18

| A | B | A | B | ................... | B |
|---|---|---|---|---|---|
| C | D | C | D | ................... | D |
| A | B | A | B | | A |
| C | D | C | D | | D |
| A | B | A | B | | B |
| ⋮ | ⋮ | | | | |
| A | B | A | B | | B |

FIRST-ARRAY PATTERN

FIG. 20

| A | B | A | B | ............... | B |
|---|---|---|---|---|---|
| C | D | C | D | ............... | D |
| D | C | D | C | | C |
| A | B | A | B | | B |
| A | B | A | B | | B |
| ⋮ | ⋮ | | | | |
| A | B | A | B | | B |

FIG. 21

| A | B | A | B | ............ | B |
|---|---|---|---|---|---|
| C | D | C | D | ............ | D |
| D | C | D | C | | C |
| B | A | B | A | | A |
| A | B | A | B | | B |
| ⋮ | ⋮ | | | | |
| B | A | B | A | | A |

FIG. 22

| A | B | A | B | ........... | B |
|---|---|---|---|---|---|
| C | A | C | A | ........... | A |
| A | B | A | B | | B |
| C | A | C | A | | A |
| A | B | A | B | | B |
| ⋮ | ⋮ | | | | |
| C | A | C | A | | A |

US 7,697,046 B2

IMAGE SIGNAL PROCESSING DEVICE AND METHOD OF IMAGE SIGNAL PROCESSING INCLUDING PIXEL ARRAY PATTERN DETERMINATION

BACKGROUND OF THE INVENTION

1. Field of the Invention

The present invention relates to an image signal processing device for processing pixel signals that are obtained by a single CCD system, and to a method of processing the pixel signals.

2. Description of the Related Art

Conventionally, several color imaging systems including the single-CCD system, the 3-CCD system, and the frame sequential method are known. In particular, the single-CCD system is used in a household video camera and in an electronic endoscope because it can output three or four color signals while having simple structure.

In the single-CCD system, a color filter array, which is composed of magenta (Mg), green (G), cyan (Cy), and yellow (Ye) color filters arranged in a mosaic array, is provided on a light-receiving surface of the CCD. On the CCD, the pixels having Mg, G, Cy, and Ye filters generate the Mg, G, Cy, and Ye color signals, respectively.

The pixel data of each pixel are read out by some kind of scanning method, for example, a progressive scan. In the progressive scan method, pixel data for each of all the pixels is independently read out, and then interpolation signals for all the pixels are generated by conducting pixel interpolation using the pixel data.

A method for the pixel interpolation of the color signals is shown in Japanese Unexamined Patent Publication (KOKAI) NO. H10-234047. In this method, the Mg, G, Cy, and Ye interpolation signals for the center of a 4×4 matrix (pixel matrix) are generated by determining which position in the 4×4 matrix the same color pixels are located on.

In the CCD used in the above method, two different color pixels alternate, both in the row direction and in the column direction. Due to this pixel arrangement, the same color pixels in all the 4×4 matrices are arranged in the same pattern; therefore, it is easy to determine which position in the 4×4 matrix the same color pixels are located on.

However, there are several types of pixel arrangements on the single CCD; for example, the color difference sequential array as shown in Japanese examined Patent Publication (KOKOKU) NO. H6-28450, and the Bayer array as shown in Japanese Unexamined Patent Publication (KOKAI) NO. S51-112228.

In the color difference sequential array, it is difficult to determine at which position in the pixel matrix the same color pixels are located according to the pattern, because the Ye pixels and the Cy pixels do not alternate in the same column; namely, the array patterns are different between the Ye pixels and the Cy pixels. Similarly, it is difficult to determine which position in the 4×4 matrix the same color pixels are located at according to the pattern, because the array patterns are different between Y (luminance) pixels and first (or second) color C1 or C2 pixels in the Bayer array. Namely, when the pixel signals are read out in a progressive scan in a CCD having one of these pixel arrangements, it is difficult to conduct pixel interpolation using the method as described above.

SUMMARY OF THE INVENTION

Therefore, an object of the present invention is to provide an image signal processing device that can conduct pixel interpolation even when pixel signals that are generated at the single-CCD having the complex pixel arrangement are read out in a progressive scan.

According to the present invention, there is an image signal processing device, for processing each pixel signal that is output from each pixel in a solid-state imaging device having a plurality of pixels. The plurality of pixels includes at least first pixels having a first color, second pixels having a second color, and third pixels having a third color. The first, second, and third pixels are regularly arranged in such a manner that, when each of the pixel is defined as a center pixel of a k×k matrix, the pixels having same color are arranged according to a one of a plurality of pixel-array patterns including at least first- and second-array patterns in the k×k matrix. The device has a determination processor and an interpolation processor.

The interpolation processor presumes which pixels have the same color as one another in the k×k matrix according to at least one of the plurality of pixel-array patterns. Then, the interpolation processor conducts a pixel interpolation in each case of presumed color arrangement according to the at least one of the plurality of pixel-array patterns, so as to generate at least one signal groups each including, at least, first, second, and third color presumed interpolation signals of the center pixel. The determination processor determines a pixel-array pattern in the k×k matrix to be a pattern selected from the plurality of pixel-array patterns. One of the signal groups generated in the case of presumed arrangement according to the determined pixel-array pattern is selected as a signal group of interpolation signals of the center pixel.

In accordance with a second aspect of the present invention, there is provided an image signal processing device, for processing each pixel signal which is output from each pixel in a solid-state imaging device having a plurality of pixels. The plurality of pixels includes at least first pixels having a first color, second pixels having a second color, and third pixels having a third color. The first, second, and third pixels are regularly arranged in such a manner that, when each of the pixel is defined as a center pixel of a k×k matrix, the pixels having same color are arranged according to a one of a plurality of pixel-array patterns including at least first- and second-array patterns in the k×k matrix. The plurality of pixels are arrayed into an m×n matrix composed of a plurality of basic matrices that are arranged in row direction and in column direction. Each basic matrix has identical pixel-arrangement. The device has a determination processor that determines a pixel-array pattern in the k×k matrix to a determined pattern which is selected from the plurality of pixel-array patterns according to which position of the basic matrix area the center pixel is located in.

In accordance with a third aspect of the present invention, there is provided an image signal processing device, for processing each pixel signal which is output from each pixel in a solid-state imaging device having a plurality of pixels. The plurality of pixels includes at least first pixels having a first color, second pixels having a second color, and third pixels having a third color. The first, second, and third pixels are regularly arranged in such a manner that, when each of the pixel is defined as a center pixel of a k×k matrix, the pixels having same color are arranged according to a one of a plurality of pixel-array patterns including at least first- and second-array patterns in the k×k matrix. The image signal processing has a determination processor and a direction detection processor.

The direction detection processor presumes which pixels have the same color as that of the center color pixels in the k×k matrix according to at least one of the plurality of pixel-array patterns. The direction detection processor detects at least one presumed correlating directions using the pixels presumed to have the same color as the center pixel in each case of at least one of the plurality of pixel-array patterns, so that pixel data of the presumed pixels that are arranged along the correlating direction are closer in value to pixel data of the center pixels than are pixel data of the presumed pixels that are arranged along other directions. The determination processor determines a pixel-array pattern in the k×k matrix to be a pattern selected from a plurality of pixel-array patterns. One of the presumed correlating direction detected, according to the determined pixel-array pattern, being selected as a correlating direction of the center pixel.

BRIEF DESCRIPTION OF THE DRAWINGS

The objects and advantages of the present invention will be better understood from the following description, with reference to the accompanying drawings in which:

FIG. 2 is a schematic view showing the pixel arrangement of the imaging sensor;

FIG. 3 is schematic view showing coordinates of pixel data of one frame;

FIG. 13 shows coefficient matrices that are used in a pixel interpolation process;

FIG. 15 shows pixel-array patterns for the 5×5 matrix when the color of each pixel is determined;

FIG. 16 is a schematic view showing another pixel arrangement of the imaging sensor;

FIG. 18 is a schematic view showing yet another pixel arrangement of the imaging sensor;

FIG. 20 is a schematic view showing yet another pixel arrangement of the imaging sensor;

FIG. 21 is a schematic view showing yet another pixel arrangement of the imaging sensor; and FIG. 22 is a schematic view showing another pixel arrangement of the imaging sensor.

DESCRIPTION OF THE PREFERRED EMBODIMENT

Figure 1:
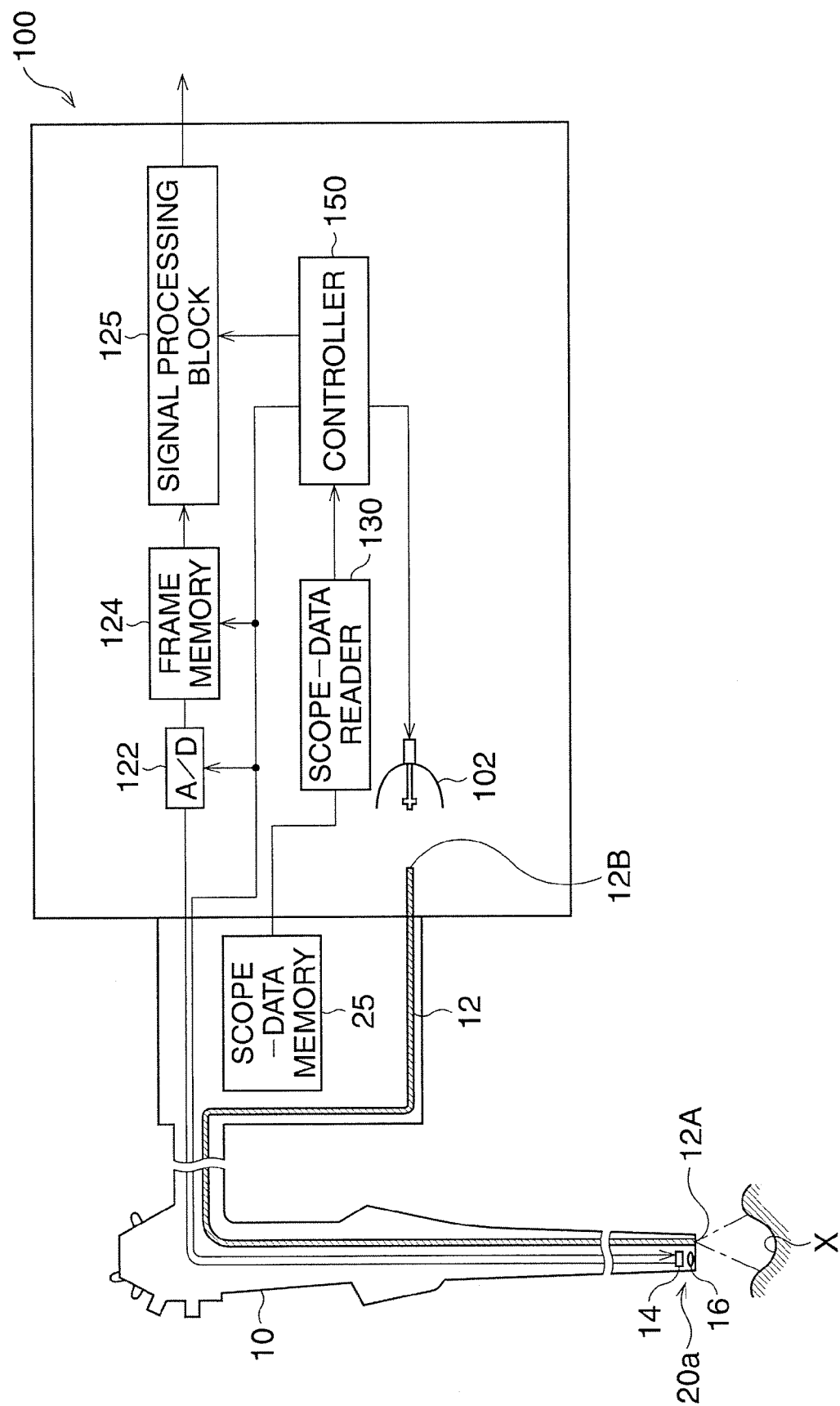
FIG. 1 is a block diagram showing an electronic endoscope in one embodiment of this invention.

The present invention is described below with reference to the embodiments shown in the drawings. Further, the embodiments are explained below, when the image device is the electronic endoscope, but this invention may be applied to other image devices, for example, digital cameras, video cameras, etc.

FIG. 1 is a block diagram showing an electronic endoscope system in one embodiment of this invention. The electronic endoscope system has a video-processor 100, a video-scope 10 that can be attached to or removed from the video-processor 100, and a monitor (not shown in the figures) that is connected to the video-processor 100.

The video-scope 10 has a light guide 12 that is composed of an optical fiber bundle and that is inserted into the video-scope 10. An output end 12A of the light guide 12 is disposed on a tip portion 20a of the video-scope 10, and an incident end 12B of the light guide 12 is disposed in the video-processor 100.

The video-processor 100 has a light source 102, an A/D converter 122, a frame memory 124, an image signal processing block 125, a controller 150, and a scope-data reader 130. The controller 150 controls the entirety of the electronic endoscope system.

When the video-scope 10 is attached to the video-processor 100, the incident end 12B is optically connected to the light source 102, which emits a white light. The white light that is emitted by the video-processor 100 is sent from the incident end 12B to the output end 12A, and is illuminated onto an object X (for example an inner wall of a digestive organ) from the output end 12A.

The video-scope 10 is provided with an imaging sensor 14 and an objective lens 16 on a tip portion 20a thereof. The imaging sensor 14 is a solid-state imaging device, which can be, for example, a single-CCD. The imaging sensor 14 is disposed backward to the objective lens 16 at the tip portion 20a. The white light illuminated onto the object X is reflected off the object X and is received on a light-receiving surface of the imaging sensor 14 through the objective lens 16, so that an optical image is formed on the light-receiving surface. Each pixel on the light-receiving surface stores an electrical charge corresponding to the optical image. In this case, the imaging sensor 14 is the progressive scan CCD. Therefore, each pixel on the light-receiving surface is progressively scanned so that the electrical charge in each pixel is independently transformed to a pixel signal. The pixel signals for all pixels that are generated on the CCD are output from the imaging sensor 14 as one frame of analog image signals.

The analog image signals are output to the A/D converter 122 and are converted to digital image signals (pixel signals), with 8 bits, for example. The digital image signals are written on a frame memory 124, and are temporarily stored therein as one frame of digital image signals. The stored frame of digital signals is read out, and is input to an image processing block 125, as pixel data $P_{11}$-$P_{mn}$ (raw image data). One frame of the digital signals undergoes pixel interpolation, and color matrix processing so as to be converted to interpolation signals for all pixels. Further, the one frame of the digital signals may undergo several other necessary signal processes, including white balance adjustment, enhancement processing, edge enhancement, and so on, while the pixel interpolation is conducted.

The interpolation signals are converted to luminance signals and color difference signals. After that, these signals are sent to the monitor (not shown) in figures and are displayed as one frame of a moving image at the monitor.

The video-scope, further, has a scope-data memory 25. The scope-data memory 25 memorizes sensor information regarding the pixel-array pattern of the imaging sensor 14. The sensor information is read by the scope-data reader 130, and is input to the control circuit 150. Furthermore, the memorized sensor information in the scope-data memory 25 differs depending on the kind of imaging sensor 14 in the video-scope 10. Therefore, the sensor information is changed according to the kind of the attached video-scope 10.

FIG. 2 is a schematic view showing pixel arrangement of the imaging device. The case of the imaging sensor 14 having the pixel-array of FIG. 2 is explained below. A plurality of pixels in the imaging sensor 14 are arranged into an m×n matrix. The m×n matrix consists of m pixel rows and n pixels columns. Further, "m" and "n" are predetermined natural numbers. Each pixel is composed of a photoelectric conversion element and a color filter element, which overlaps the photoelectric conversion element, and which has one color selected from Cy, Mg, Ye, and G. Further, as shown in FIG. 2, "A" pixel, "B" pixel, "C" pixel, and "D" pixel mean, respectively, a pixel having one color filter selected from the Cy filter, the Mg filter, the Ye filter, or the G filter.

The analog signals in one frame are independently read out from the imaging sensor 14 for each pixel. After the analog signals are converted to digital signals, one frame of the digital signals, which are composed of pixel data $P_{11}$-$P_{mn}$ as shown in FIG. 3, are temporarily stored in the frame memory 124. The pixel data $P_{11}$-$P_{mn}$ form an m×n matrix. The m×n matrix is the same as the matrix of the imaging sensor 14. Further, the pixel data "$P_{ab}$" corresponding to the pixel which is located at the $a^{th}$ row in the $b^{th}$ column, where "a" and "b" means the integer number among from "1" to "m" and among from "1" to "n", respectively.

As shown in FIG. 2, "A", "B", "C", and "D" pixels are arrayed regularly; namely, a plurality of basic matrices α having the identical pixel-arrangement are arranged in row direction and in column direction so as to form the m×n matrix. The basic matrix α is formed from a pair of 2×2 matrices consisting of "A", "B", "C", and "D" pixels, the 2×2 matrices arranged in the column direction. Due to this, each basic matrix α is composed of a 4×2 matrix.

In the m×n matrix, "A" and "B" pixels alternate on the same odd row (for example, the $1^{st}$ and $3^{rd}$ rows), and "C" and "D" pixels alternate on the same even row (for example, the $2^{nd}$ and $4^{th}$ rows).

In all the even rows, "C" and "D" pixels alternate in the same phase. Namely, "C" pixels are always arranged in the odd columns and "D" pixels are always arranged in the even columns. On the other hand, "A" and "B" pixels are arranged in different phases every $2n+3^{rd}$ rows (where n is a positive integer including zero; therefore $2n+3^{rd}$ can be $3^{rd}$, for example) and $2n+1^{st}$ rows (for example, $2n+1^{st}$ can be $1^{st}$). Namely, "A" pixels are alternately arranged in the same column every two "A" pixels in the column directions. Similarly, "B" pixels are alternately arranged in the same column every two "B" pixels in the column directions.

Figure 4:
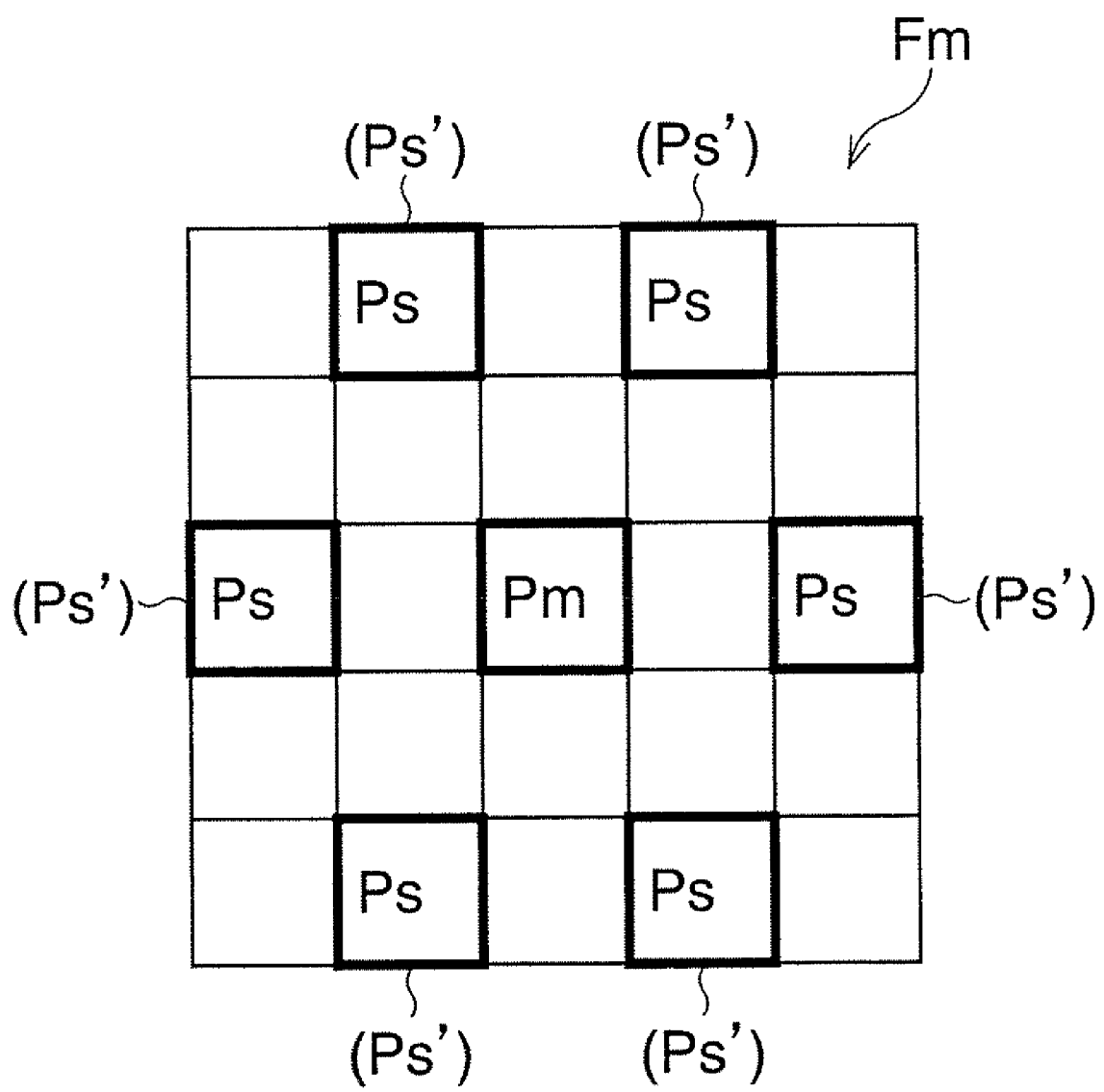
FIG. 4 shows positions where first surrounding pixels of the same color as a center pixel are arranged relative to the center pixel, according to a first-array pattern in a 5×5 matrix.
Figure 5:
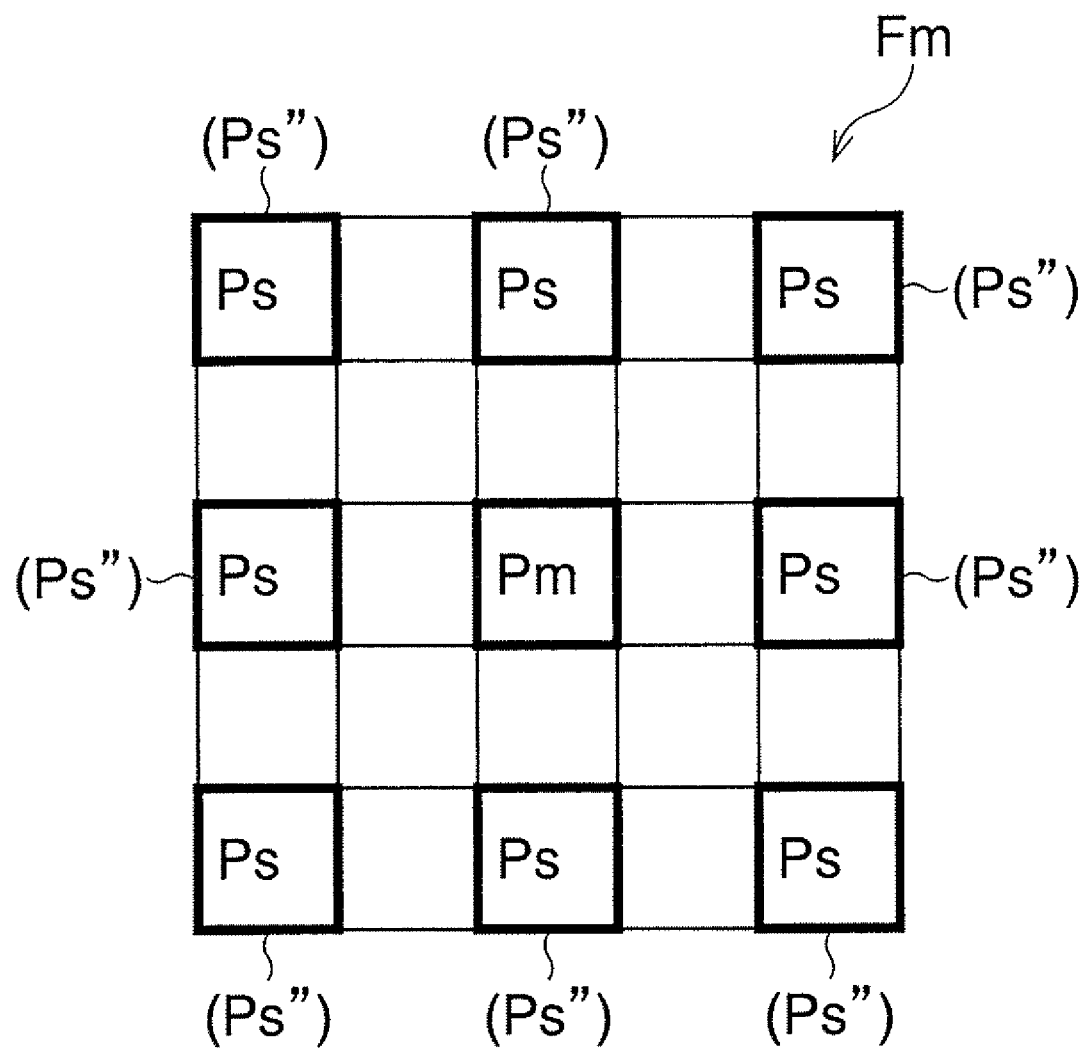
FIG. 5 shows positions where second surrounding pixels of the same color as a center pixel are arranged relative to the center pixel, according to a second-array pattern in a 5×5 matrix.

Next, the array pattern for pixels surrounding pixel Ps relative to the center pixel Pm in the m×n matrix is explained below using FIGS. 2, 4, and 5.

Each pixel in the imaging sensor 14 is defined as a center pixel Pm, and the same color pixels as the color of the center pixel Pm are defined as the surrounding pixels Ps, in a 5×5 matrix. Namely, the pixels that surround the defined center pixel Pm and that have the same color as the color of the center pixel Pm are defined as the surrounding pixels Ps. In this case, the pixel-array pattern in the 5×5 matrix for the surrounding pixels Ps relative to the center pixel Pm becomes a first-array pattern as shown in FIG. 4, or a second-array pattern as shown in FIG. 5. Further, the 5×5 matrix indicates a matrix area having five pixel rows and five pixel columns, where the center pixel Pm is located in the center of the 5×5 matrix in both row and column directions.

As described above, the m×n matrix is composed of a plurality of the basic matrices α, such that "A", "B", "C", and "D" pixels are regularly arrayed. In particular, the "A" and "B" pixels are arrayed in the same way as each other; therefore, when the "A" or "B" pixel is the center pixel Pm, the pixel-array pattern for the surrounding pixels Ps relative to the center pixel Pm always becomes the first-array pattern (refer to FIG. 4). Similarly, the "C" and "D" pixels are arrayed in the same way as each other; therefore, when the C or D pixel is the center pixel Pm, the pixel-array pattern for the surrounding pixel Ps relative to the center pixel Pm always becomes the second-array pattern (refer to FIG. 5).

Figure 6:
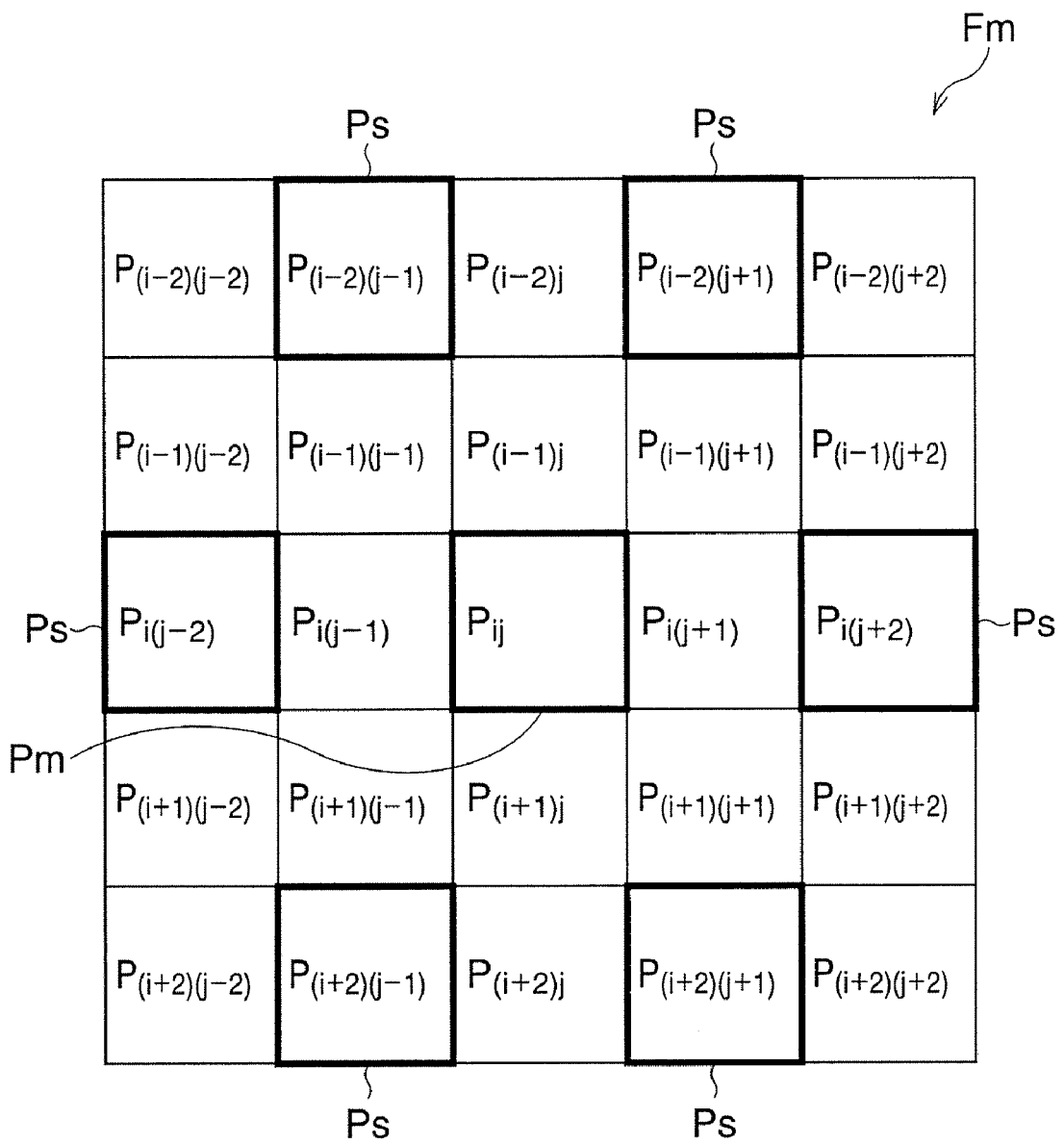
FIG. 6 shows coordinates of pixel data in the 5×5 matrix according to the first array-pattern.
Figure 7:
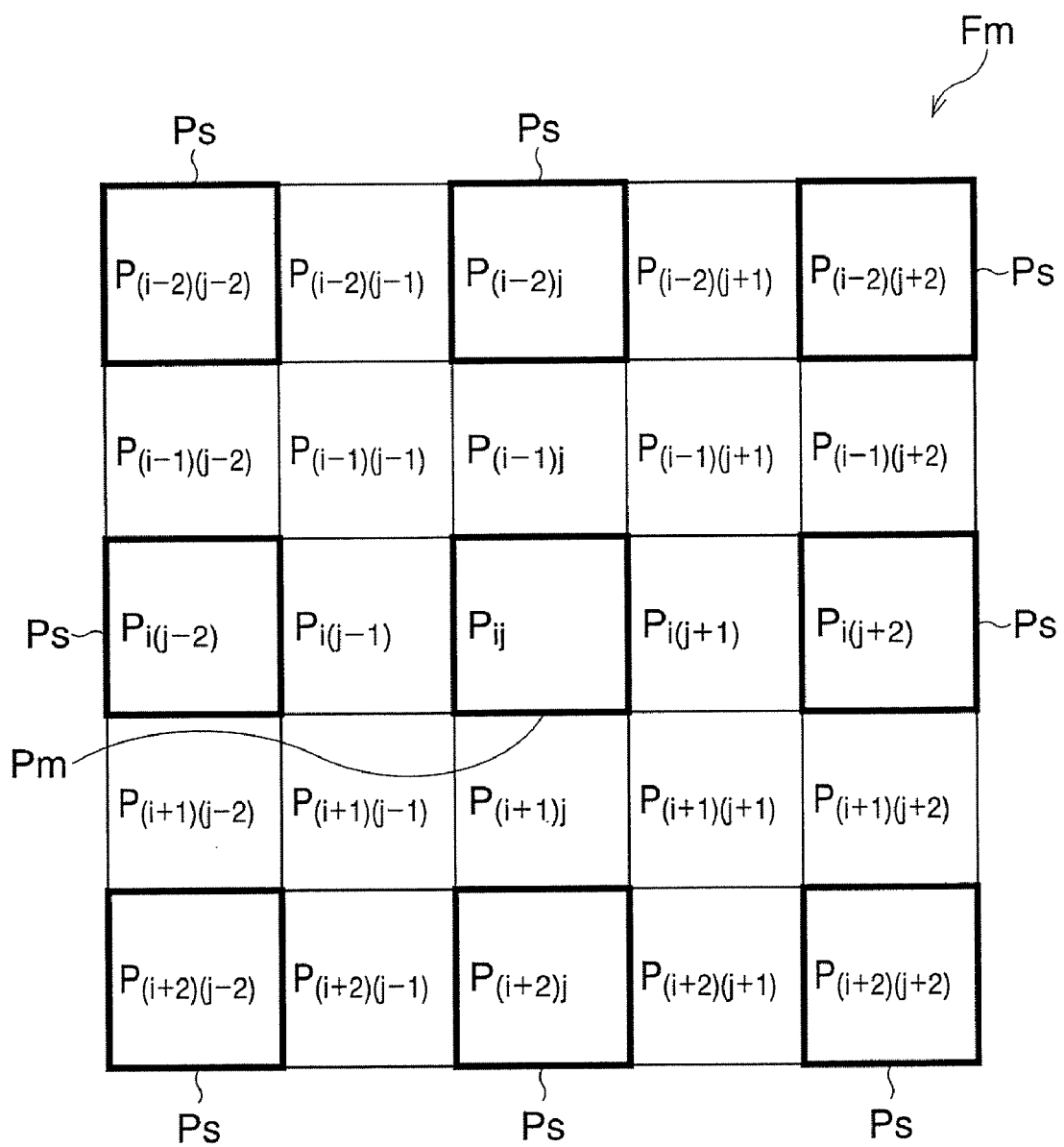
FIG. 7 shows coordinates of pixel data in the 5×5 matrix according to the second array-pattern.

Accordingly, if the pixel data of the center pixel Pm is the pixel data $P_{ij}$ when the "A" or "B" pixel is the center pixel Pm, the pixel data of the surrounding pixels Ps are pixel data $P_{(i-2)(j-1)}$, $P_{(i-2)(j+1)}$, $P_{i(j-2)}$, $P_{i(j+2)}$, $P_{(i+2)(j-1)}$, $P_{(i+2)(j+1)}$ for the 5×5 matrix Fm, as shown in FIG. 6. On the other hand, if the pixel data of the center pixel Pm is the pixel data $P_{ij}$ when the "C" or "D" pixel is the center pixel Pm, the pixel data of the surrounding pixels Ps are pixel data $P_{(i-2)(j-2)}$, $P_{(i-2)j}$, $P_{(i-2)(j+2)}$, $P_{i(j-2)}$, $P_{i(j+2)}$, $P_{(i+2)(j-2)}$, $P_{(i+2)j}$, $P_{(i+2)(j+2)}$ for the 5×5 matrix Fm, as shown in FIG. 7.

Figure 8:
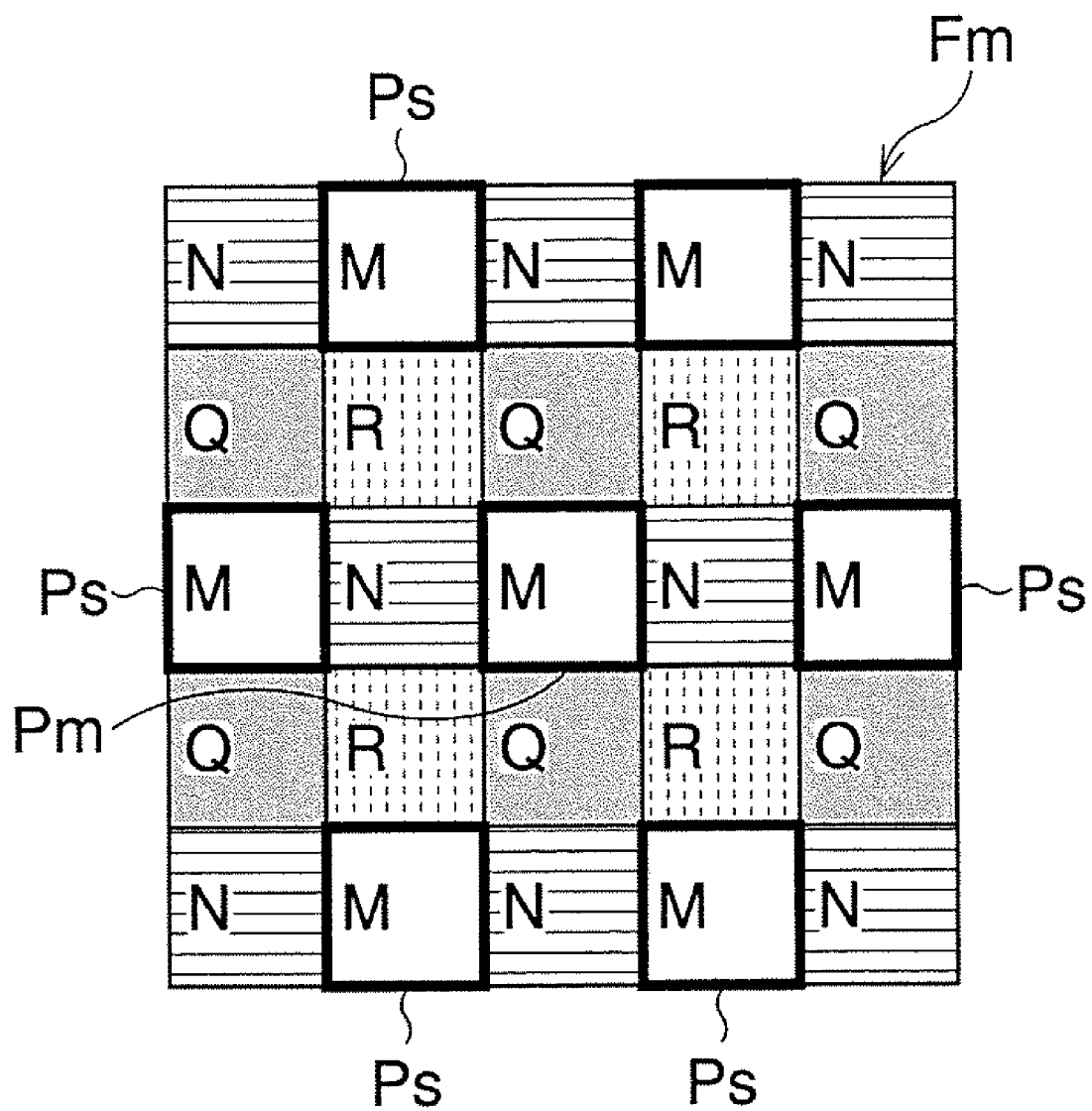
FIG. 8 schematically shows the arrangement of the colors of the pixels when pixels in the 5×5 matrix are arranged according to the first-array pattern.
Figure 9:
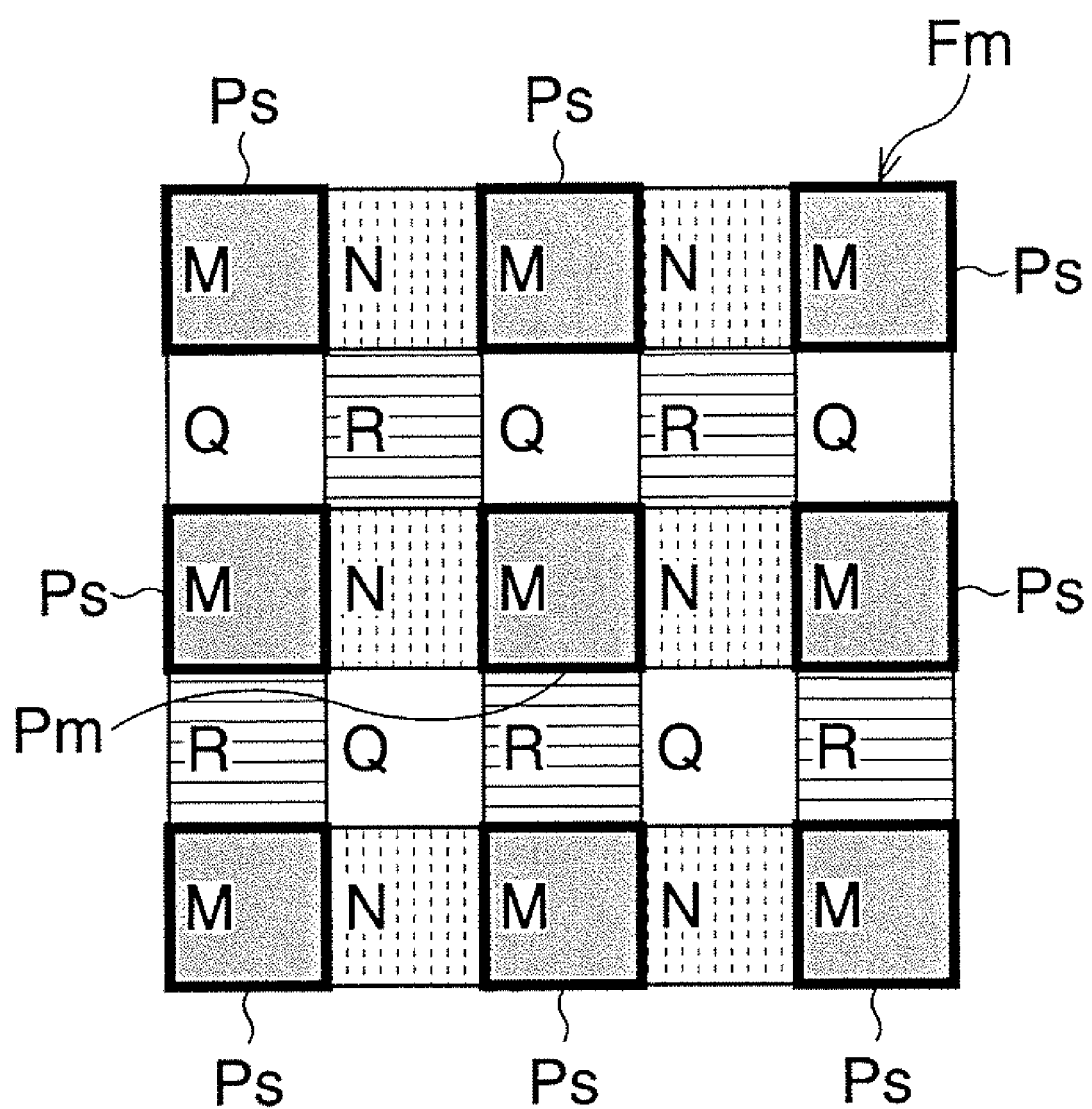
FIG. 9 schematically shows the arrangement of the colors of the pixels when pixels in the 5×5 matrix are arranged according to the second-array pattern.

Next, the pixel-array pattern of color pixels other than the surrounding pixels Ps and the center pixel Pm in the 5×5 matrix Fm is explained below, using FIGS. 8 and 9. FIG. 8 shows the pixel-array pattern of all pixels in the 5×5 matrix for the color arrangement of the first-array pattern. FIG. 9 shows the pixel-array pattern of all pixels in the 5×5 matrix for the color arrangement of the second-array pattern.

If the pixel-array pattern is the first-array pattern, the pixel-array pattern of the pixels having the same color for each color is a fixed pattern, because the m×n matrix consists of a plurality of the basic matrices α. Namely, if both the center pixel Pm and the surrounding pixels Ps are defined as "M" pixels as shown in FIG. 8 and the pixels having the same color filter for each color other than that of the center pixel Pm are "N", "Q", and "R" pixels, the array-pattern for each of the "N", "Q", and "R" pixels is fixed as shown in FIG. 8. In this case, "N" is indicated as one of "A" or "B", and "Q" and "R" are indicated as either "C" or "D", respectively.

Similarly, if the pixel-array pattern is the second-array pattern, the pixel-array pattern of the pixels having the same color filter for each color is also a fixed pattern. Namely, if both the center pixel Pm and the surrounding pixels Ps are defined as "M" pixels as shown in FIG. 9, and the pixels having the same color filter for each color other than the center pixel Pm are "N", "Q", and "R" pixels, the array-pattern for each of "N", "Q", and "R" pixels is fixed, as shown in FIG. 9. In this case, "N" is indicated as one of "C" or "D", and "Q" and "R" are indicated as either "A" or "B", respectively.

As described above, the first- and second-array patterns also indicate which positions the pixels having the same color as one another for each color ("M", "N", "Q", or "R") are arranged in the 5×5 matrix Fm also. Namely, they indicate not only in which positions the pixels having the same color as the color of the center pixel Pm are arranged in the 5×5 matrix, but also in which positions the pixels having the same color as one another, where the color is different from the color of the center pixel Pm, are arranged in the 5×5 matrix Fm.

Figure 10:
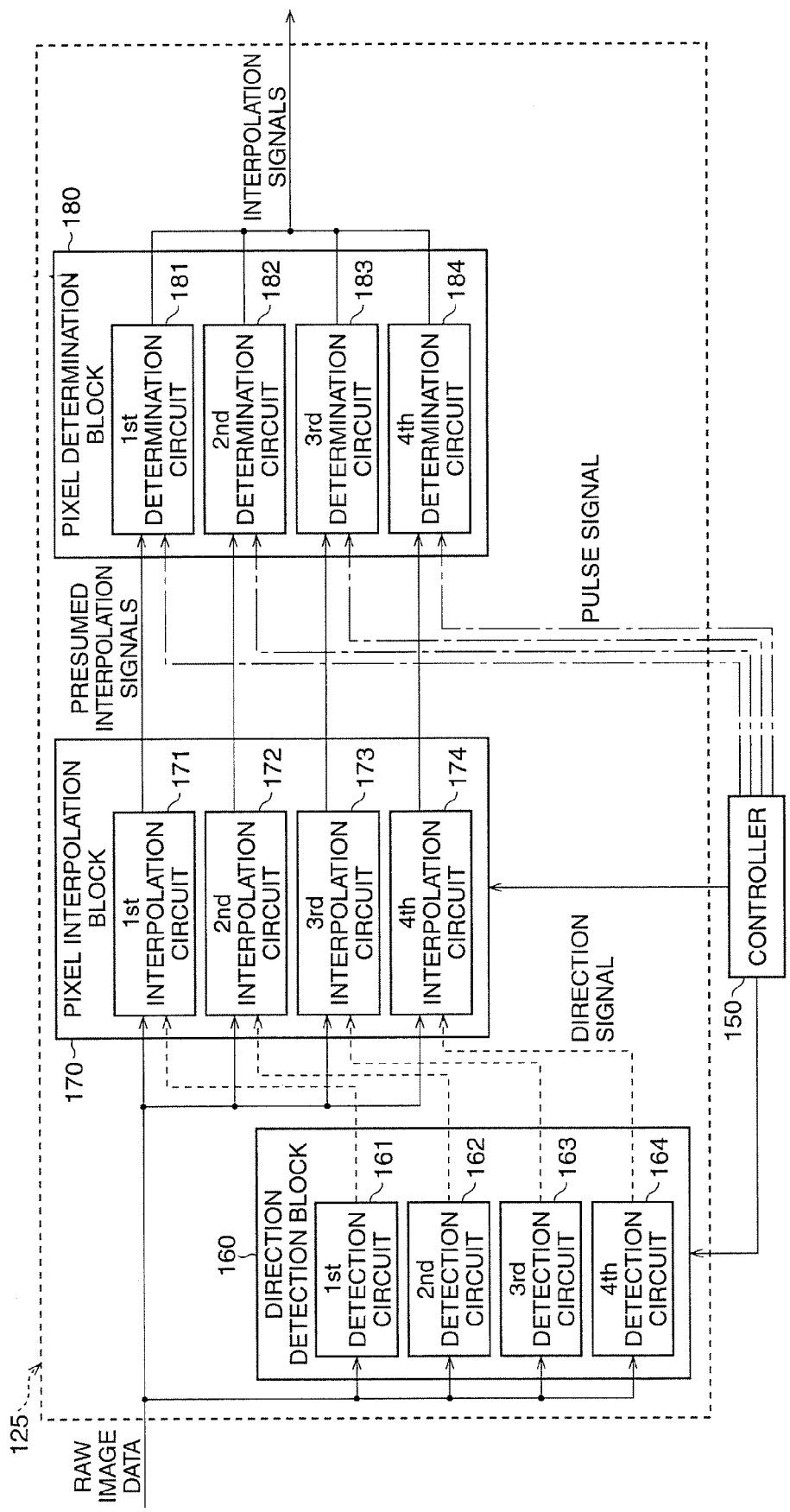
FIG. 10 is a block diagram showing the signal processing block.

FIG. 10 is a block diagram showing the signal processing block. The signal processing is explained in detail below, using FIG. 10. As shown in FIG. 10, the signal processing block has a direction detection block 160, a pixel interpolation block 170, and a pixel determination block 180.

The direction detection block 160 detects a correlating direction of each pixel signal. Usually, in the process for detecting the correlating direction, when each pixel is defined as the center pixel Pm, both the center pixel Pm and the surrounding pixels Ps that have same color as the center pixel Pm are used. However, in this embodiment, the surrounding pixels Ps can not be automatically selected, because there are a plurality of patterns (two patterns in the case of FIG. 2) for the array patterns of the surrounding pixels Ps relative to the center pixel Pm.

Therefore, the direction detection block 160 has a plurality of detection circuits, for example, $1^{st}$-$4^{th}$ detection circuits 161-164. Accordingly, it can detect the correlating direction corresponding to the plurality of patterns for the array patterns. Each of the $1^{st}$-$4^{th}$ detection circuits 161-164 presumes the surrounding pixels Ps to be arranged according to the corresponding predetermined array pattern, and detects a presumed correlating direction using the presumed surrounding pixels Ps and the center pixels Pm in each predetermined array pattern. Further, because in the case of FIG. 2, the number of the pixel-array pattern is only two, the $3^{rd}$ and $4^{th}$ circuit 163 and 164 are not used, as described below.

In this embodiment, the predetermined array patterns are the first- and second-array patterns; therefore, the $1^{st}$-$2^{nd}$ detection circuits 161-162 detect first and second presumed correlating directions, respectively, while the predetermined array pattern is determined to be the first- or second-array patterns. On the other hand, the $3^{rd}$-$4^{th}$ detection circuits 163-164 do not detect the $3^{rd}$ and $4^{th}$ presumed correlating directions because there are no $3^{rd}$- and $4^{th}$-array patterns.

Next, the method of detecting the first presumed directions is explained below in detail. The pixel data $P_{11}$-$P_{mn}$ (raw image data) which is one frame of digital image signal is input to the first detection circuit 161. At the circuit 161, each pixel is successively defined as the center pixel Pm, and the pixel data in the 5×5 matrix Fm whose center is the defined center pixel Pm is successively read out together with the pixel data of center pixel Pm.

Next, each of the pixel-array patterns in the 5×5 matrix Fm is presumed to be the first-array pattern at the circuit 161. Then, referring to FIG. 4, the pixels in the 5×5 matrix Fm, which are presumed to have the same color filter as the defined the center pixel Pm according to the first-array pattern, are treated as first presumed surrounding pixels Ps'. Next, the first presumed correlating direction is detected using pixel data $P_{(i-2)(j-1)}$, $P_{(i-2)(j+1)}$, $P_{i(j-2)}$, $P_{i(j+2)}$, $P_{(i+2)(j-1)}$, $P_{(i+2)(j+1)}$ (refer to FIG. 6) of the first presumed surrounding pixels Ps' and the pixel data $P_{ij}$ of the center pixel Pm at the first detection circuit 161.

First, when the first presumed correlating direction is detected, correlating indices D1-D4 are calculated, as shown in formulae (1)-(4). The correlating indices D1-D4 indicate correlations between the center pixel Pm and the first presumed surrounding pixels Ps' that are arranged vertically, horizontally, left-diagonally at a 45 degree angle relative to the vertical, and right-diagonally at a 45 degree angle relative to the vertical in the 5×5 matrix Fm, respectively. As described below, the smaller the correlating indices D1-D4, the stronger the correlations.

Figure 11:
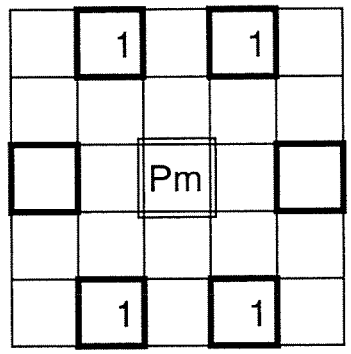
FIG. 11 shows operators that are used when pixels in the 5×5 matrix are arranged according to the first array-pattern.
Figure 11:
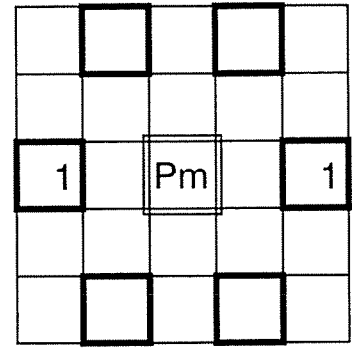
Figure 11:
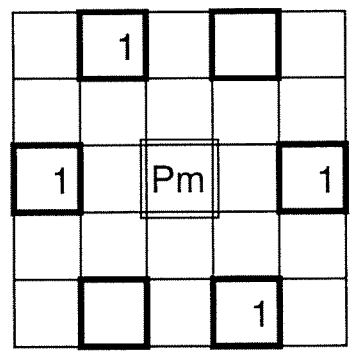
Figure 11:
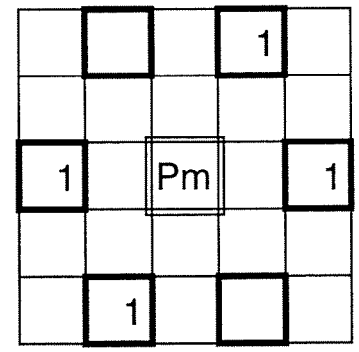

For example, the correlating index D1 indicates the correlation between the center pixel Pm and the first presumed surrounding pixels Ps' that are located along the vertical relative to the center pixel Pm. Namely, the correlating index D1 indicates the correlation between the pixel data of the center pixel Pm, and both the pixel data ($P_{(i-2)(j-1)}$, $P_{(i-2)(j+1)}$) of pixels that are located above the center pixel Pm and the pixel data ($P_{(i+2)(j-1)}$, $P_{(i+2)(j+1)}$) of pixels that are located below the center pixel Pm. The distance between each pixel of the above first presumed surrounding pixels Ps' and the center pixel Pm are the same, and the diagonal angle of each pixel relative to the vertical is the same; therefore, all of the pixels in the above first presumed surrounding pixels Ps' are referred to by the correlating index D1 in the same proportion when the correlating index D1 is calculated. Namely, the correlating index D1 is calculated by using a first operator (matrix) whose coefficients are the same as one another, as shown in FIG. 11. Accordingly, the correlating index D1 is obtained by adding the difference between the arithmetic average of the pixel data ($P_{(i-2)(j-1)}$, $P_{(i-2)(j+1)}$) and the pixel data $P_{ij}$ of the center pixel Pm to the difference between the arithmetic average of the pixel data ($P_{(i+2)(j-1)}$, $P_{(i+2)(j+1)}$) and the pixel data $P_{ij}$, as shown in formula (1).

Pixel Correlating Indices Formulae by Direction for First Presumed Surrounding Pixels Ps':

Vertical Direction:

$$D1=|(P_{(i-2)(j-1)}+P_{(i-2)(j+1)})/2-P_{ij}|+|(P_{(i+2)(j-1)}+P_{(i+2)(j+1)})/2-P_{ij}| \quad (1)$$

Horizontal Direction:

$$D2=|P_{i(j-2)}-P_{ij}|+|P_{i(j+2)}-P_{ij}| \quad (2)$$

Left-Diagonal Direction:

$$D3=|(P_{(i-2)(j-1)}+P_{i(j-2)})/2-P_{ij}|+|(P_{i(j+2)}+P_{(i+2)(j+1)})/2-P_{ij}| \quad (3)$$

Right-Diagonal Direction:

$$D4=|(P_{(i-2)(j+1)}+P_{i(j+2)})/2-P_{ij}|+|(P_{i(j-2)}+P_{(i+2)(j-1)})/2-P_{ij}| \quad (4)$$

The correlating index D1 is greater, if the difference in value between the pixel data of the above first presumed surrounding pixels Ps' and the pixel data $P_{ij}$ of the center pixel Pm is greater. Namely, the smaller the correlating index D1, the stronger the correlation between the pixel data $P_{ij}$ of the center pixel Pm and the pixel data of the first presumed surrounding pixels Ps' arranged vertically relative to the center pixel Pm. That is to say, the smaller the correlating index D1, the closer the value between the pixel data of the center pixel Pm and the pixel data of the first presumed surrounding pixels Ps' arranged vertically relative to the center pixel Pm.

Similarly, the indices D2-D4 are calculated, respectively, according to the $2^{nd}$-$4^{th}$ operators (namely, the formulae (2), (3), and (4)). After calculating D1-D4, the correlating indices D1-D4 are compared with one another. As a result of this comparison, the direction corresponding to the correlating index having the smallest value in the correlating indices D1-D4 is detected to be the first presumed correlating direction. Due to this, the value of the pixel data of the first presumed surrounding pixels Ps' that are arranged along the first presumed correlating direction are closer to the value of the pixel data of the center pixels Pm than are the value of the pixel data of the first presumed surrounding pixels Ps' that are arranged along other directions. Further, when at least two of the correlating indices D1-D4 are identical and the lowest, the first presumed correlating direction is detected as "no correlating direction".

Further, as described above, the correlating indices D1-D4 are calculated using the arithmetic average of pixel data of the first presumed surrounding pixels Ps', but the correlating indices D1-D4 may be calculated using the weighted average thereof.

Next, the method of detecting the second presumed direction is explained in detail below. The pixel data $P_{11}$-$P_{mn}$ (raw image data) which is one frame of the digital image signal, is also input to the second detection circuit 162. In the circuit 162, each pixel is successively defined as the center pixel, and the pixel data in the 5×5 matrix Fm whose center is the defined center pixel Pm is successively read out together with the pixel data of the defined center pixel Pm.

Next, each of the pixel-array patterns in the 5×5 matrix Fm is presumed to be the second-array pattern. Then, referring to FIG. 5, the pixels in the 5×5 matrix Fm, having the same color filter as the center pixel Pm in accordance with the second-array pattern, are treated as the second presumed surrounding pixels Ps". Next, the second presumed correlating direction is detected using pixel data $P_{(i-2)(j-2)}$, $P_{(i-2)j}$, $P_{(i-2)(j+2)}$, $P_{i(j-2)}$, $P_{i(j+2)}$, $P_{(i+2)(j-2)}$, $P_{(i+2)j}$, $P_{(i+2)(j+2)}$ of the second presumed surrounding pixels Ps" and the pixel data $P_{ij}$ of the center pixel Pm at the second detection circuit 162.

When the second presumed correlating direction is detected, correlating indices D1'-D4' are calculated, as shown in formulae (5)-(8), similarly to those of the first presumed correlating direction. The correlating indices D1'-D4' indicate correlations between the center pixel Pm and the second presumed surrounding pixels Ps" that are arranged vertically, horizontally, left-diagonally, and right-diagonally in the 5×5 matrix Fm, similarly to the correlating indices D1-D4. Namely, the correlating indices D1-D4 indicate a correlation between the center pixel Pm and the second presumed surrounding pixels Ps" that are arranged along each direction. For example, the correlating index D1' means the correlation between the center pixel Pm and the second presumed surrounding pixels Ps" that are located in the vertically relative to the center pixel Pm.

Figure 12:
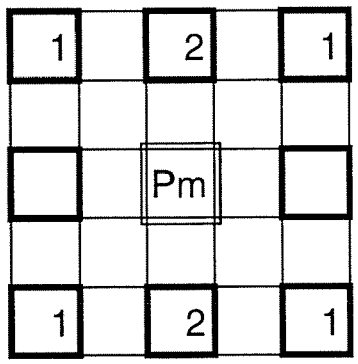
FIG. 12 shows operators that are used when pixels in the 5×5 matrix are arranged according to the second array-pattern.
Figure 12:
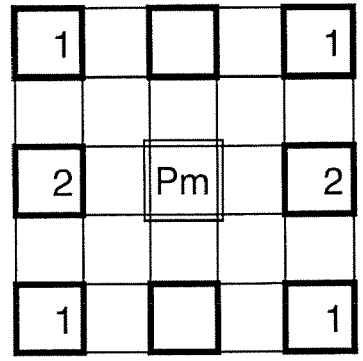
Figure 12:
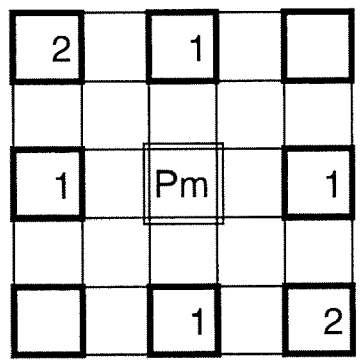
Figure 12:
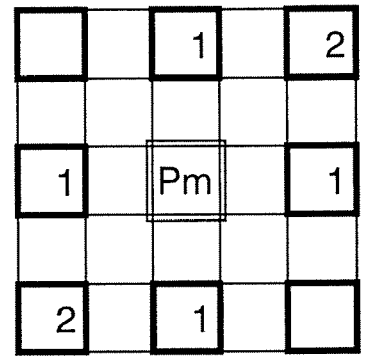

When the correlating index D1' is calculated, the pixel data $P_{(i-2)j}$, $P_{(i-2)(j-2)}$, $P_{(i-2)(j+2)}$ of pixels located above the center pixel Pm and the pixel data $P_{(i+2)j}$, $P_{(i+2)(j-2)}$, $P_{(i+2)(j+2)}$ of pixels located below the center pixel Pm are utilized. The diagonal angle of each of the utilized pixel relative to the vertical are different (namely, some pixels are located vertically relative to the center pixel Pm, but other pixels are located in the direction diagonal to the vertical direction); therefore, some of the utilized pixels are referred to by the correlating index D1 in relatively higher level, but others are referred by in relatively lower level when the correlating index D1 is calculated. Accordingly, the correlating index D1' is calculated by using a fifth operator (matrix) whose coefficients are different, as shown in FIG. 12. Namely, the correlating index D1' is obtained by adding the difference between the weighted average of the pixel data $P_{(i-2)j}$, $P_{(i-2)(j-2)}$, $P_{(i-2)(j+2)}$ and the pixel data $P_{ij}$ of the center pixel Pm to the difference between the weighted average of the pixel data $P_{(i+2)j}$, $P_{(i+2)(j-2)}$, $P_{(i+2)(j+2)}$ and the pixel data $P_{ij}$.

Similarly, the indices D2'-D4' are calculated according to $6^{th}$-$8^{th}$ operators, respectively; namely, the formulae (6), (7), and (8). The correlating indices D1'-D4' are compared with one another, and the direction corresponding to the correlating index having the smallest value in the correlating indices D1'-D4' are determined as the second presumed correlating direction. The pixel data of the second presumed surrounding pixels Ps" that are arranged along the second presumed correlating direction are closer in value to pixel data of the center pixels Pm than are pixel data of the second presumed surrounding pixels Ps" that are arranged along other directions. Further, when at least two of the correlating indices D1'-D4' are identical and the lowest, the second presumed correlating direction is detected as "no correlating direction".

Pixel Correlating Indices Formulae by Direction for First Presumed Surrounding Pixels Ps':

Vertical Direction:

$$D1' = |(2P_{(i-2)j} + P_{(i-2)(j-2)} + P_{(i-2)(j+2)})/4 - P_{ij}| + |(2P_{(i+2)j} + P_{(i+2)(j-2)} + P_{(i+2)(j+2)})/4 - P_{ij}| \quad (5)$$

Horizontal Direction:

$$D2' = |(2P_{i(j-2)} + P_{(i-2)(j-2)} + P_{(i+2)(j-2)})/4 - P_{ij}| + |(2P_{i(j+2)} + P_{(i-2)(j+2)} P_{(i+2)(j+2)})/4 - P_{ij}| \quad (6)$$

Left-Diagonal Direction:

$$D3' = (2P_{(i-2)(j-2)} + P_{i(j-2)} + P_{(i-2)j})/4 - P_{ij}| + |(2P_{(i+2)(j+2)} + P_{(i+2)j} + P_{i(j+2)})/4 - P_{ij}| \quad (7)$$

Right-Diagonal Direction:

$$D4' = |(2P_{(i-2)(j+2)} + P_{(i-2)j} + P_{i(j+2)})/4 - P_{ij}| + |(2P_{(i+2)(j-2)} + P_{i(j-2)})/4 - P_{ij}| \quad (8)$$

Further, the coefficients in the $6^{th}$-$8^{th}$ operators are different according to the direction relative to the center pixel Pm as shown in FIG. 12, similarly to with that in the $5^{th}$ operator.

As described above, the number of the presumed direction is determined according to the number of pixel-array patterns, in this embodiment. Accordingly, as the number of the pixel-array patterns are only two, for example in case of the m×n matrix as shown in FIG. 2, the first- and second-presumed directions are only calculated as the presumed direction using the first and second detection circuits 161 and 162, but the third and fourth detection circuits 163 and 164 are not used in the situation described above.

The direction detection block 160 has stored a plurality of formulae for calculating the correlating indices, including the formulae (1)-(8). Some formulae for calculating the correlating indices are selected from the plurality of formulas and read out, according to the basic matrix α. The basic matrix α is determined by the sensor information that is sent from the scope-data memory 25 as described above.

For example, when the scope information indicates that the basic matrix α is as shown in FIG. 2, the formulae (1)-(8) are read out, and the information thereof are sent to the first and second detection circuits 161 and 162. At the first and second detection circuit 161 and 162, the first and second presumed correlating directions are respectively detected based on the formulae (1)-(8). However, the information of the formulae are not sent to the third and fourth detection circuits 163 and 164; therefore, the presumed correlating directions are not detected at these circuits 163 and 164.

The pixel interpolation block 170 has $1^{st}$-$4^{th}$ interpolation circuits 171-174. Data of the presumed correlating directions (direction signal) that are generated, respectively, at the $1^{st}$-$4^{th}$ detection circuits 161-164 are input, respectively, to the $1^{st}$-$4^{th}$ interpolation circuits 171-174. The pixel data $P_{11}$-$P_{mn}$ (raw image data) are also input to each of the $1^{st}$-$4^{th}$ interpolation circuits 171-174.

At each of the $1^{st}$-$4^{th}$ interpolation circuits 171-174, the pixel interpolation is conducted using the pixel data $P_{11}$-$P_{mn}$, the data of the presumed correlating direction, and the pixel information as described below.

Next, the method of pixel interpolation is explained below. As described above, if the center pixel Pm is an "A" pixel or a "B" pixel, the pixel-array pattern in the 5×5 matrix Fm is the first-array pattern, as shown in FIG. 8. On the other hand, if the center pixel Pm is a "C" pixel or a "D" pixel, the pixel-array pattern in the 5×5 matrix Fm is the second-array pattern, as shown in FIG. 9.

At the first interpolation circuit 171, as the 5×5 matrix Fm changes according to the change of the center pixel Pm, pixels in the 5×5 matrix Fm are presumed to be arrayed according to the first-array pattern. Therefore, it is presumed that the "M", "N", "P", and "Q" pixels in FIG. 8 maintain the same color filter for different the 5×5 matrices Fm based on different center pixel Pm. The pixel interpolation is conducted based on the above presumed color arrangement at the first interpolation circuit 171.

First, in each case of each pixel data $P_{ij}$ treated as the pixel data of the center pixel Pm, the pixel data $P_{(i-2)(j-2)}, \ldots, P_{ij}, \ldots,$ and $P_{(i+2)(j+2)}$ (refer to FIG. 6) in the 5×5 matrix Fm are read out. Next, each pixel in the 5×5 matrix Fm is grouped into "M", "N", "Q", or "R" presumed groups, so that each group has the pixels that are all presumed to have same color filter, according to the first-array pattern. As is clear from FIGS. 6 and 8, the pixel data $P_{(i-2)(j-1)}, P_{(i-2)(j+1)}, P_{i(j-2)}, P_{ij}, P_{i(j+2)}, P_{(i+2)(j-1)}, P_{(i+2)(j+1)}$ are grouped into a presumed "M" color group; the pixel data $P_{(i-2)(j-2)}, P_{(i-2)j}, P_{(i-2)(j+2)}, P_{i(j-1)}, P_{i(j+1)}, P_{(i+2)(j-2)}, P_{(i+2)j}, P_{(i+2)(j+2)}$ are grouped into a presumed "N" color group; the pixel data $P_{(i-1)(j-2)}, P_{(i-1)j}, P_{(i-1)(j+2)}, P_{(i+1)(j-2)}, P_{(i+1)j}, P_{(i+1)(j+2)}$ are grouped into a presumed "Q" color group; and the pixel data $P_{(i-1)(j-1)}, P_{(i-1)(j+1)}, P_{(i+1)(j-1)}, P_{(i+1)(j+1)}$ are grouped into a presumed "R" color group. The pixel information regarding which group each pixel is grouped into is generated based on the first-array pattern of the scope information at the controller 150, and is input to the first interpolation circuit 171.

The pixel interpolation block 170 has stored $1^{st}$-$5^{th}$ coefficient matrices (operators) Y1-Y5, as shown in FIG. 13. At the first interpolation circuit 171, the $1^{st}$-$5^{th}$ coefficient matrices Y1-Y5 are each read out according to the first presumed correlating direction, respectively. Namely, when the first presumed correlating direction is the vertical direction, horizontal direction, left-diagonal direction, right-diagonal direction, or no direction, the $1^{st}$-$5^{th}$ coefficient matrices Y1-Y5 are read out, respectively. The $1^{st}$-$5^{th}$ coefficient matrices Y1-Y5 are 5×5 matrices, whose coefficients correspond to each pixel in the 5×5 matrix Fm.

The coefficients are set up according to the presumed correlating direction and the distance between the pixel corresponding to the coefficient and the center pixel Pm. For example, in the first coefficient matrix Y1 corresponding to the vertical direction, the coefficients corresponding to the pixels located on the left and right end areas in the 5×5 matrix Fm are determined to be 0, and other coefficients are determined to be 1-4, as shown in FIG. 13. That is to say, when the first presumed correlating direction is the vertical direction, the pixel interpolation regarding the center pixel Pm is conducted by using the pixel data of the pixels located relatively vertically.

Similarly, when the presumed correlating direction is the horizontal direction, the left-diagonal direction, or the right-diagonal direction, the pixel interpolation of the center pixel Pm is conducted by using the pixel data of the pixel data located horizontally, left-diagonally, or right-diagonally relative to the center pixel Pm in the 5×5 matrix Fm, respectively, as shown in $2^{nd}$-$4^{th}$ coefficient matrices. Further, when the presumed correlating direction is no direction, the pixel interpolation of the center pixel Pm is conducted by using the pixel data of the pixel data located in almost all the pixels in the 5×5 matrix Fm except for the pixels located in each of the four corners in the 5×5 matrix Fm, as shown in $5^{th}$ coefficient matrices.

Further, the coefficient matrices Y1-Y5 are examples of operators to conduct the pixel interpolation; therefore, other matrix may also be used. Of course, the size of the operator is not limited to a 5×5 pixel matrix.

Each of the pixel data $P_{(i-2)(j-2)}, \ldots, P_{ij}, \ldots, P_{(i+2)(j+2)}$ in the 5×5 matrix Fm is multiplied by each of the coefficients of the relevant operator Y1-Y5. Further, the coefficient is multiplied by the pixel data whose pixel is located at the same position at the 5×5 matrix Fm as the position the coefficient is located at in the operator. The multiplied pixel data of the same presumed color group "M", "N", "Q", and "R" are summed up. The sum of the multiplied pixel data in each presumed color group "M", "N", "Q", and "R" is divided by the sum of the coefficients corresponding to pixels of each group, so as to obtain a first signal group including "M" color, "N" color, "Q" color or "R" color presumed interpolation signals m', n', q' and r' of the center pixel Pm. Further, the "M" color, "N" color, "Q" color and "R" color are one of the "A", "B", "C", or "D" colors, respectively.

For example, when the first presumed correlating direction is the vertical direction, the first signal group of presumed interpolation signals m', n', q' and r' of the center pixel Pm are calculated, respectively, according to formulae (9), (10), (11), and (12) as described below.

$$m' = \frac{4P_{ij} + P_{(i-2)(j-1)} + P_{(i-2)(j+1)} + P_{(i+2)(j-1)} + P_{(i+2)(j+1)}}{8} \quad (9)$$

$$n' = \frac{2P_{(i-2)j} + 2P_{i(j-1)} + 2P_{i(j+1)} + 2P_{(i+2)j}}{8} \quad (10)$$

$$q' = \frac{2P_{(i-1)j} + 2P_{(i+1)j}}{4} \quad (11)$$

$$r' = \frac{P_{(i-1)(j-1)} + P_{(i-1)(j+1)} + P_{(i+1)(j-1)} + P_{(i+1)(j+1)}}{4} \quad (12)$$

At the second interpolation circuit 172, as the 5×5 matrix Fm changes according to the change of the center pixel Pm, pixels in the 5×5 matrix Fm are presumed to be arrayed according to the second-array pattern. Therefore, it is presumed that the "M", "N", "P", and "Q" color pixels in FIG. 9 maintain the same color filter for different the 5×5 matrices Fm based on different center pixel Pm. The pixel interpolation is conducted based on the above presumed color arrangement at the second interpolation circuit 172.

At first, in each case of each pixel data $P_{ij}$ treated as the pixel data of the center pixel Pm, the pixel data $P_{(i-2)(j-2)}, \ldots, P_{ij}, \ldots,$ and $P_{(i+2)(j+2)}$ (refer to FIG. 6) in the 5×5 matrix Fm are read out. Next, each pixel in the 5×5 matrix Fm is grouped into "M", "N", "Q", or "R" presumed groups, so that each group has the pixels that are all presumed to have the same color filter according to the second-array pattern. As is clear from FIGS. 7 and 9, the pixel data $P_{(i-2)(j-2)}, P_{(i-2)j}, P_{(i-2)(j+2)}, P_{i(j-2)}, P_{ij}, P_{i(j+2)}, P_{(i+2)(j-2)}, P_{(i+2)j}, P_{(i+2)(j+2)}$ are grouped into a presumed "M" color group; the pixel data $P_{(i-2)(j-1)}, P_{(i-2)(j+1)}, P_{i(j-1)}, P_{i(j+1)}, P_{(i+2)(j-1)}, P_{(i+2)(j+1)}$ are grouped into a presumed "N" color group; the pixel data $P_{(i-1)(j-2)}, P_{(i-1)j}, P_{(i-1)(j+2)}, P_{(i+1)(j-1)}, P_{(i+1)(j+1)}$ are grouped into a presumed "Q" color group; and the pixel data $P_{(i-1)(j-1)}, P_{(i-1)(j+1)}, P_{(i+1)(j-2)}, P_{(i+1)j}, P_{(i+1)(j+2)}$ are grouped into a presumed "R" color group. The pixel information regarding which group each pixel is grouped into is generated based on the second-array pattern of the scope information at the controller 150, and is input to the second interpolation circuit 172.

At the second interpolation circuit 172, when the presumed correlating direction is the vertical direction, the horizontal direction, the left-diagonal direction, the right-diagonal direction, or no direction, respectively, the $1^{st}$-$5^{th}$ coefficient matrices Y1-Y5 are read out, respectively, similarly to the matrix at the second interpolation circuit 172. Further, the $1^{st}$-$5^{th}$ coefficient matrices Y1-Y5 are the same as the $1^{st}$-$5^{th}$ coefficient matrices Y1-Y5 that are used in the first interpolation circuit 171.

Each of the pixel data $P_{(i-2)(j-2)}, \ldots, P_{ij}, \ldots, P_{(i+2)(j+2)}$ in the 5×5 matrix Fm is multiplied by the coefficient in the operator Y1-Y5 corresponding to the pixel of each pixel data. The multiplied pixel data in the same presumed color group "M", "N", "Q", or "R" are summed up. The sum of the multiplied pixel data in each presumed color group "M", "N", "Q", and "R" is divided by the sum of the coefficients corresponding to the pixels in each group, so as to obtain a second signal group including "M" color, "N" color, "Q" color, and "R" color presumed interpolation signals m", n", q", and r" corresponding to the center pixel Pm. Further, the "M" color, "N" color, "Q" color and "R" color are one of the "A", "B", "C", and "D" colors, respectively.

For example, when the presumed correlating direction is the vertical direction, the second signal group of presumed interpolation signals m", n", q", and r", corresponding to the center pixel Pm, are calculated according to formulas (13), (14), (15), and (16), respectively, as described below.

$$m'' = \frac{4P_{ij} + 2P_{(i-2)j} + 2P_{(i+2)j}}{8} \quad (13)$$

$$n'' = \frac{2P_{i(j-1)} + 2P_{i(j+1)} + P_{(i-2)(j-1)} + P_{(i-2)(j+1)} P_{(i+2)(j-1)} + P_{(i+2)(j+1)}}{8} \quad (14)$$

$$q'' = \frac{2P_{(i-1)j} + P_{(i+1)(j-1)} + P_{(i+1)(j+1)}}{4} \quad (15)$$

$$r'' = \frac{2P_{(i+1)j} + P_{(i-1)(j-1)} + P_{(i-1)(j+1)}}{4} \quad (16)$$

In the case of the m×n matrix as shown in FIG. 2, there are only two pixel-array patterns; therefore, the third and fourth detection circuits 163 and 164 do not generate the presumed correlating direction, and the data of the presumed correlating direction is not input from the third and fourth detection circuits 163 and 164 to the third and fourth interpolation circuits 173 and 174. Accordingly, the third and fourth interpolation circuits 173 and 174 do not generate the presumed interpolation signals.

The pixel determination block 180 has $1^{st}$-$4^{th}$ determination circuits 181-184. The first signal groups of presumed interpolation signals that are generated at the first interpolation circuit 171 are successively input to the first determination circuit 181 per pixel from the pixel located at $1^{st}$ row in $1^{st}$ column to the pixel located at $m^{th}$ row in the $n^{st}$ column, as show in FIG. 14. The second signal groups of presumed interpolation signals are input to the second determination circuit 182, similarly to the first signal group of presumed interpolation signals. The input of the first and second signal groups of presumed interpolation signals for the same center pixel are synchronized so that the first and second signal groups of presumed interpolation signals for the same center pixel are input to the first and second determination circuits 181 and 182 at the same time. One of the first and second signal groups of presumed interpolation signals that is input at the same time is selected as the signal group of interpolation signals of the center pixel Pm, as described below.

Further, the interpolation signals of the center pixels arranged on the $1^{st}$, $2^{nd}$, m-$1^{th}$, and m$^{th}$ rows, are not generated in practice, because these center pixels can not be positioned on the center of the 5×5 matrix Fm. Similarly, the interpolation signals of the center pixels arranged on the $1^{st}$, $2^{nd}$, n-$1^{th}$, and n$^{th}$ columns are not generated either.

Figure 14:
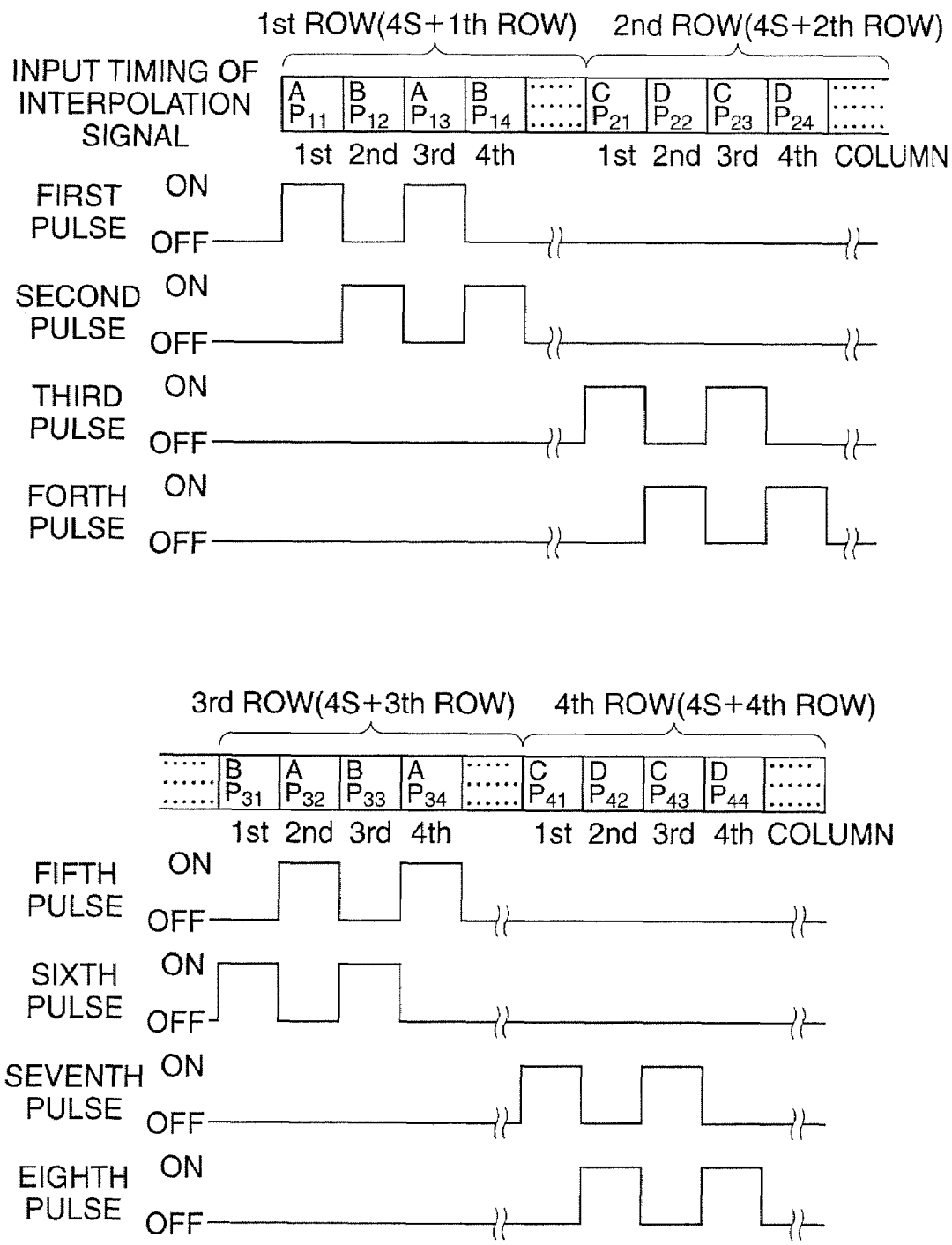
FIG. 14 shows the relation between the input timing of the interpolation signals and the input timing of the pulse signals.

Next, the method of selecting the signal group of interpolation signals of the center pixel Pm from the first or second signal group of the presumed interpolation signals is explained in detail below using FIG. 14.

Let "s" be a non-negative integer. Then, as shown in FIG. 14, $1^{st}$, $2^{nd}$, $3^{rd}$, $4^{th}$, $5^{th}$, $6^{th}$, $7^{th}$, and $8^{th}$ type of pulse signals are synchronously input to the pixel determination block 180 with the input of the first and second signal groups of presumed interpolation signals of the center pixel being located at each 4s+$1^{th}$ row in the odd columns, each 4s+$1^{th}$ row in the even columns, each 4s+$2^{th}$ row in the odd columns, each 4s+$2^{th}$ row in the even columns, each 4s+$3^{th}$ row in the even columns, each 4s+$3^{th}$ row in the odd columns, each 4s+$4^{th}$ row in the odd columns, and each 4s+$4^{th}$ row in the even columns in the m×n matrix, respectively.

In addition to this, the $1^{st}$, $2^{nd}$, $5^{th}$, and $6^{th}$ type of pulse signals are input to the first determination circuit 181. On the other hand, the $3^{rd}$, $4^{th}$, $7^{th}$, and $8^{th}$ type of pulse signals are input to the second determination circuit 182.

Incidentally, "A" pixels are located at the $1^{st}$ row in the $1^{st}$ column or at the $3^{rd}$ row in the $2^{nd}$ column in the basic matrix α (namely, at each 4s+$1^{th}$ row in the odd columns or at each 4s+$3^{th}$ row in the even columns in the m×n matrix). Therefore, the $1^{st}$ and $5^{th}$ type of pulse signals are synchronously input to the first interpolation circuit 181 with the input of the signal group of presumed interpolation signals of the center pixel Pm being "A" color pixels.

At the first interpolation circuit 181, the first signal group of the presumed interpolation signals that is synchronously input thereto with input of the $1^{st}$ and $5^{th}$ type of pulse signals is selected as the signal group of interpolation signals of the center pixel Pm. On the other hand, the second signal group of presumed interpolation signals of the center pixel, located at the $1^{st}$ row in the $1^{st}$ column or at the $3^{rd}$ row in the $2^{nd}$ column in the basic matrix α, is not selected as the signal group of interpolation signals of the center pixel Pm, because when these signals are input to the second interpolation circuit 182, the pulse signals are not input thereto.

Namely, when the center pixel Pm is located at the $1^{st}$ row in the $1^{st}$ column or at the 3 row in the $2^{nd}$ column in the basic matrix α, the pixel-array pattern in the 5×5 matrix Fm is determined as the first pattern at the controller 150, based on the sensor information. Due to this determination, the first signal group of presumed interpolation signals for the center pixel Pm, located at the $1^{st}$ row in the $1^{st}$ column or at the $3^{rd}$ row in the $2^{nd}$ column in the basic matrix α, is selected as the signal group of interpolation signals of the center pixel Pm, based on the $1^{st}$ and $5^{th}$ type of pulse signals.

Similarly, when the center pixel Pm is located at the $1^{st}$ row in the $2^{nd}$ column or at the $3^{rd}$ row in the $1^{st}$ column of the basic matrix α, the pixel-array pattern in the 5×5 matrix Fm is determined to be the first pattern, because "B" pixels are located at the $1^{st}$ row in the $2^{nd}$ column or at the $3^{rd}$ row in the $1^{st}$ column in the basic matrix α. Due to this determination, the first signal group of presumed interpolation signals for the center pixel Pm located at the $1^{st}$ row in the $2^{nd}$ column or at the $3^{rd}$ row in the $1^{st}$ column of the basic matrix α is selected as the signal group of interpolation signals of the center pixel Pm based on the $2^{nd}$ and $6^{th}$ type of pulse signals.

As described above, the first signal group of the presumed interpolation signals m', n', q' and r' is selected as the signal group of interpolation signals of the center pixel Pm when the center pixel Pm is located on the $1^{st}$ and the $3^{rd}$ rows of the basic matrix α, based on the pulse signals.

Similarly, when the center pixel Pm is located at the $2^{nd}$ row in the $1^{st}$ column or at the $4^{th}$ row in the $1^{st}$ column in the basic matrix α, the pixel-array pattern in the 5×5 matrix Fm is determined to be the second pattern, because the "C" pixels are located at the $2^{nd}$ row in the $1^{st}$ column or at the $4^{th}$ row in the $1^{st}$ column in the basic matrix α. Due to this determination, the second signal group of presumed interpolation signals for the center pixel Pm, located at the $2^{nd}$ row in the $1^{st}$ column or at the $4^{th}$ row in the $1^{st}$ column in the basic matrix α is selected as the signal group of interpolation signals of the center pixel Pm, based on the $3^{rd}$ and $7^{th}$ type of pulse signals.

Similarly, when the center pixel Pm is located at the $2^{nd}$ row in the $2^{nd}$ column or at the $4^{th}$ row in the $2^{nd}$ column in the basic matrix α, the pixel-array pattern in the 5×5 matrix Fm is determined to be the second pattern, because the "D" pixels are located at the $2^{nd}$ row in the $2^{nd}$ column or at the $4^{th}$ row in the $2^{nd}$ column in the basic matrix α. Due to this determination, the second signal group of presumed interpolation signals for the center pixel Pm located at the $2^{nd}$ row in the $2^{nd}$ column or at the $4^{th}$ row in the $2^{nd}$ column in the basic matrix α is selected as the signal group of interpolation signals of the center pixel Pm based on the $4^{th}$ and $8^{th}$ type of pulse signals.

As described above, the second signal group of presumed interpolation signals m", n", q" and r" are selected as the signal group of interpolation signals of the center pixel Pm when the center pixel Pm is located at the $2^{nd}$ and the $4^{th}$ rows of the basic matrix α, based on the pulse signals.

In the pixel interpolation block 180, the color of each of the selected interpolation signals m', n', q' and r' (or m", n", q", and r") are determined according to the type of the pulse signal. This determination is explained below, using FIGS. 14 and 15.

As described above, the first type of pulse signal is synchronously input to the first interpolation circuit 181 with the input of the first and second signal groups of presumed interpolation signals for the center pixels Pm located in the odd column of the $4s+1^{st}$ row (namely, the $1^{st}$ row of the basic matrix a).

Figure 15:
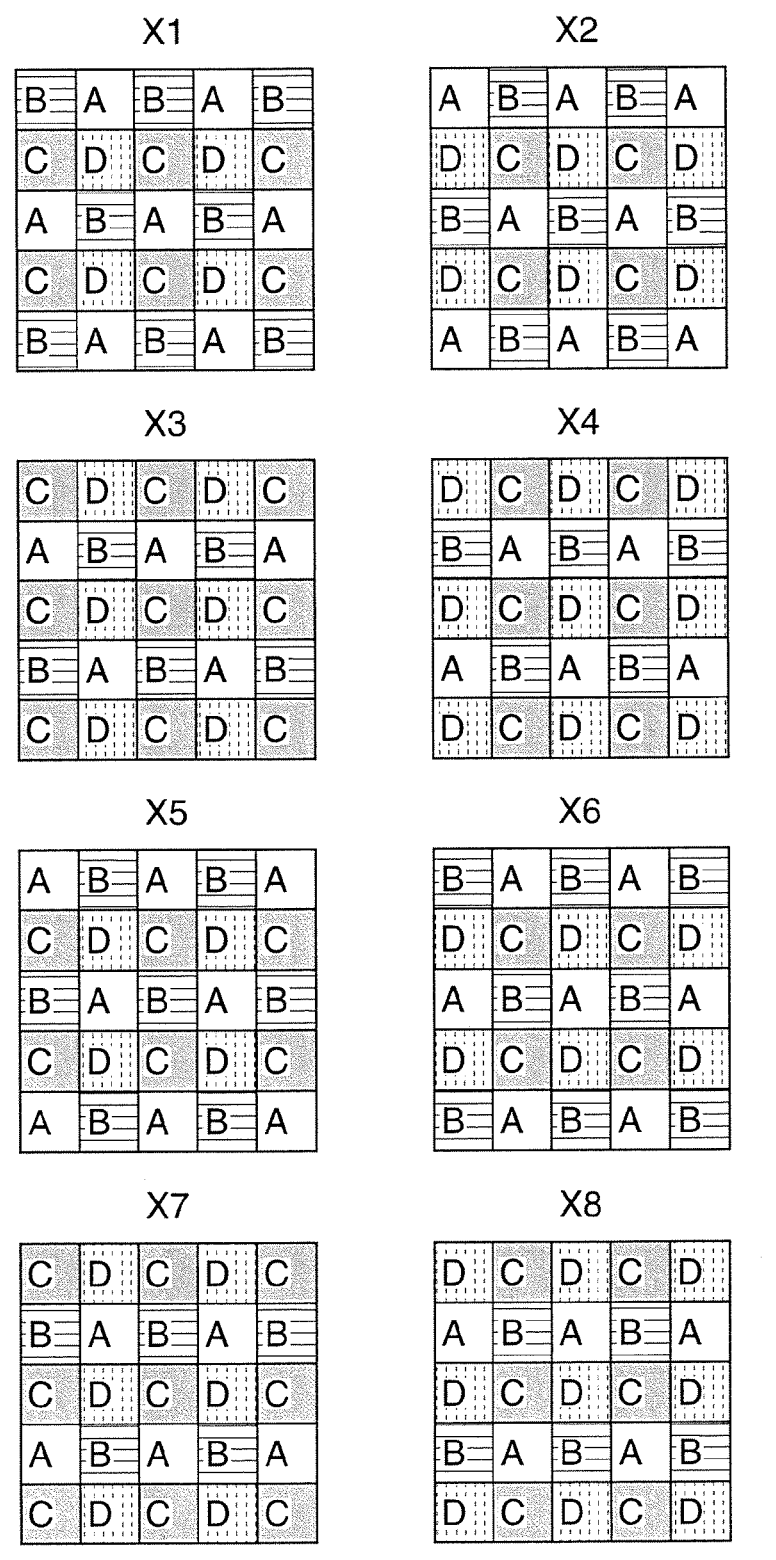

On the other hand, the m×n matrix is composed of a plurality of the basic matrices α, which are arrayed in the vertical and horizontal directions. Therefore, when the pixel that is located at each odd column of each $4s+1^{st}$ row is defined as the center pixel Pm, the pixel-array of the 5×5 matrix Fm is a first array X1, as shown in FIG. 15, and the color of each pixel "M", "N", "Q", or "R" is the color "A", "B", "C", or "D", respectively. Accordingly, each color of the interpolation signals m', n', q', or r', which is input to the circuit 181 at the same time as that of the first type of pulse signal, is determined to be the color "A", "B", "C", or "D", respectively, based on the sensor information.

Similarly, when the pixel that is located in the even column of each $4s+3^{rd}$ row is defined as the center pixel Pm, the pixel-array of the 5×5 matrix Fm is a sixth array X6, as shown in FIG. 15, and the color of each pixel "M", "N", "Q", or "R" is the color "A", "B", "D", or "C", respectively. Accordingly, each color of the interpolation signals m', n', q' or r', which is input at the same time as that of the sixth type of pulse signal, is determined to be the color "A", "B", "D", or "C", respectively.

The colors of the first and second interpolation signals of the center pixel Pm being "B", "C", or "D" pixels are determined according to the pulse signals, similarly to with the center pixel Pm being an "A" pixel.

As described above, when the solid-state imaging device, which is a progressive scan CCD, has a complex pixel arrangement, the image processing block can conduct the pixel interpolation of the pixel signals according to the complex pixel arrangement by a simple process. Further, the generation of pseudo color in the interpolation signal can be decreased, because the pixel interpolation and detection of correlating direction is conducted according to the pixel arrangement. Furthermore, the resolution of images can be increased because the pixel signal is independently read out by a progressive scan from the solid-state imaging device with a complex pixel arrangement.

Next, the case where the solid-state imaging device having a different pixel arrangement from that in FIG. 2 is applied to this embodiment is explained below.

Figure 16:
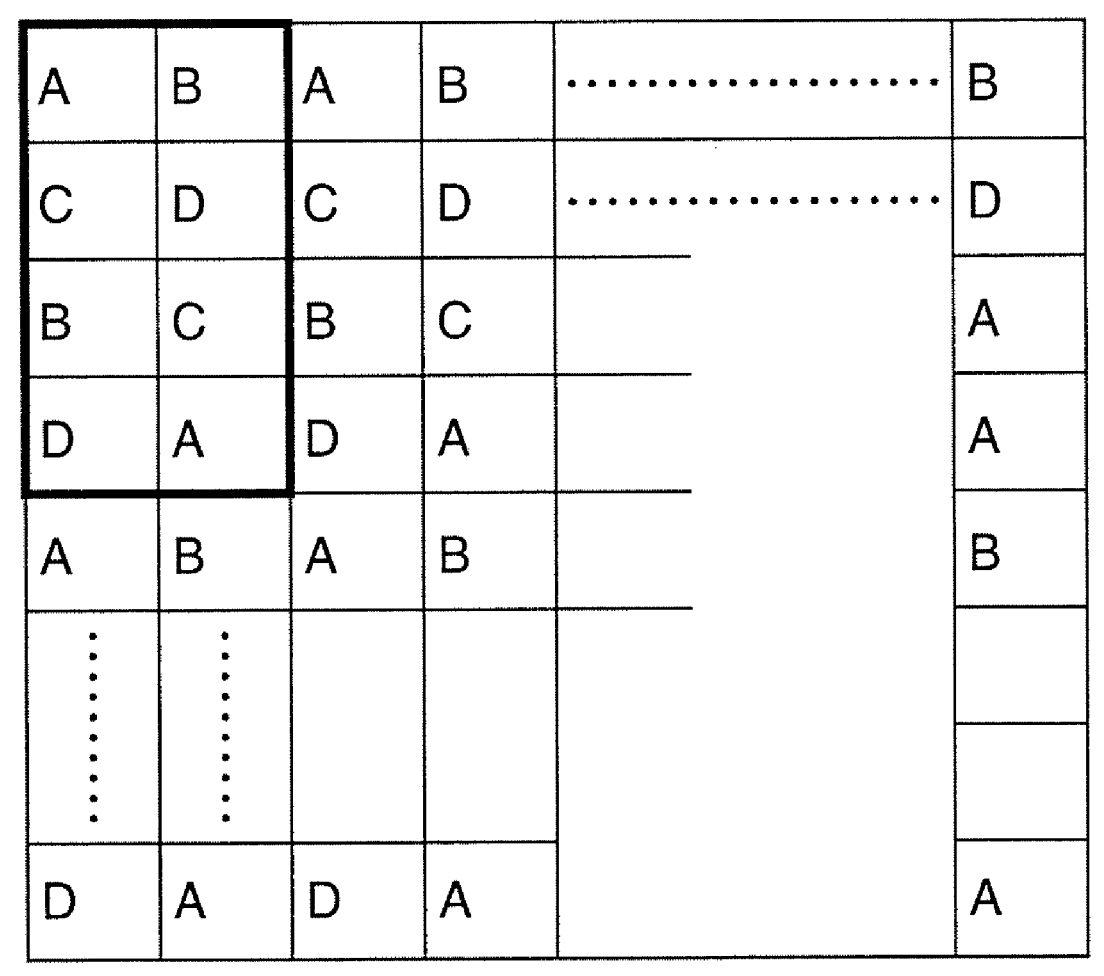

FIG. 16 shows an example of a solid-state imaging device having a different pixel arrangement from that in FIG. 2. In this device, the number of the pixel-array patterns of the 5×5 pixel is four, so patterns from first to fourth exist, as shown in FIG. 17.

Therefore, the information for the formulae for calculating the correlating indices according to the $1^{st}$-$4^{th}$ patterns are read from the direction detection block 160 and the information input to the $1^{st}$-$4^{th}$ detection circuits 161-164, respectively. The $1^{st}$-$4^{th}$ detection circuits 161-164 presume that the pixel-array patterns in the 5×5 matrix Fm are the $1^{st}$-$4^{th}$ pattern and detect the $1^{st}$-$4^{th}$ presumed correlating directions using the formulas, respectively.

Figure 17:
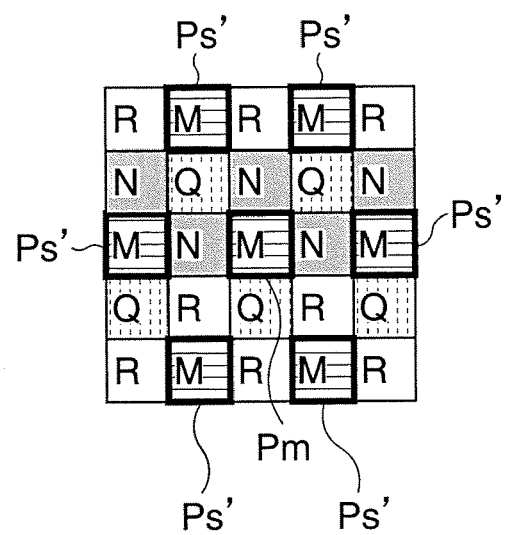
FIG. 17 is a schematic view showing pixel-array patterns for the 5×5 matrix when the pixel arrangement is as in FIG. 16.
Figure 17:
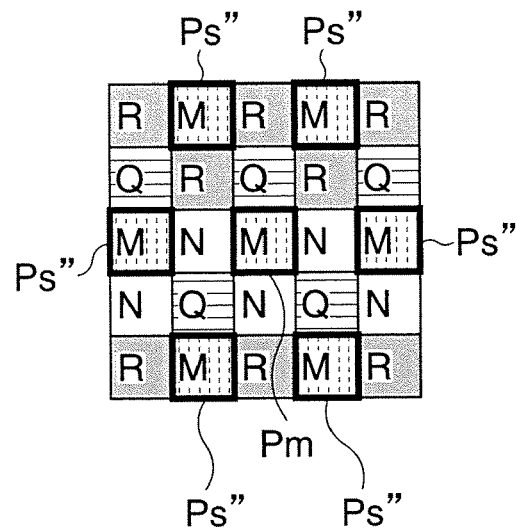
Figure 17:
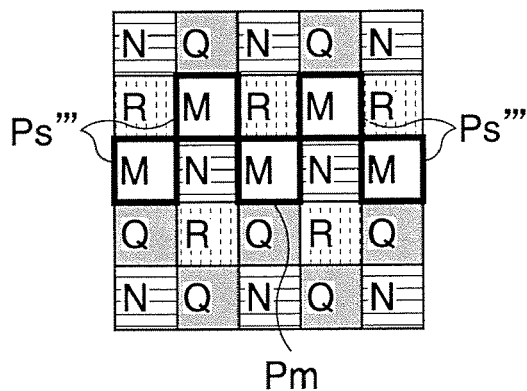
Figure 17:
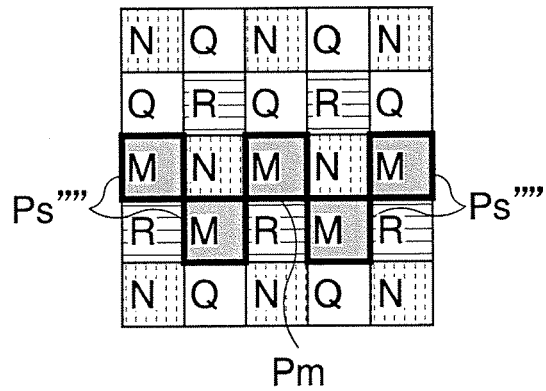
Figure 19:
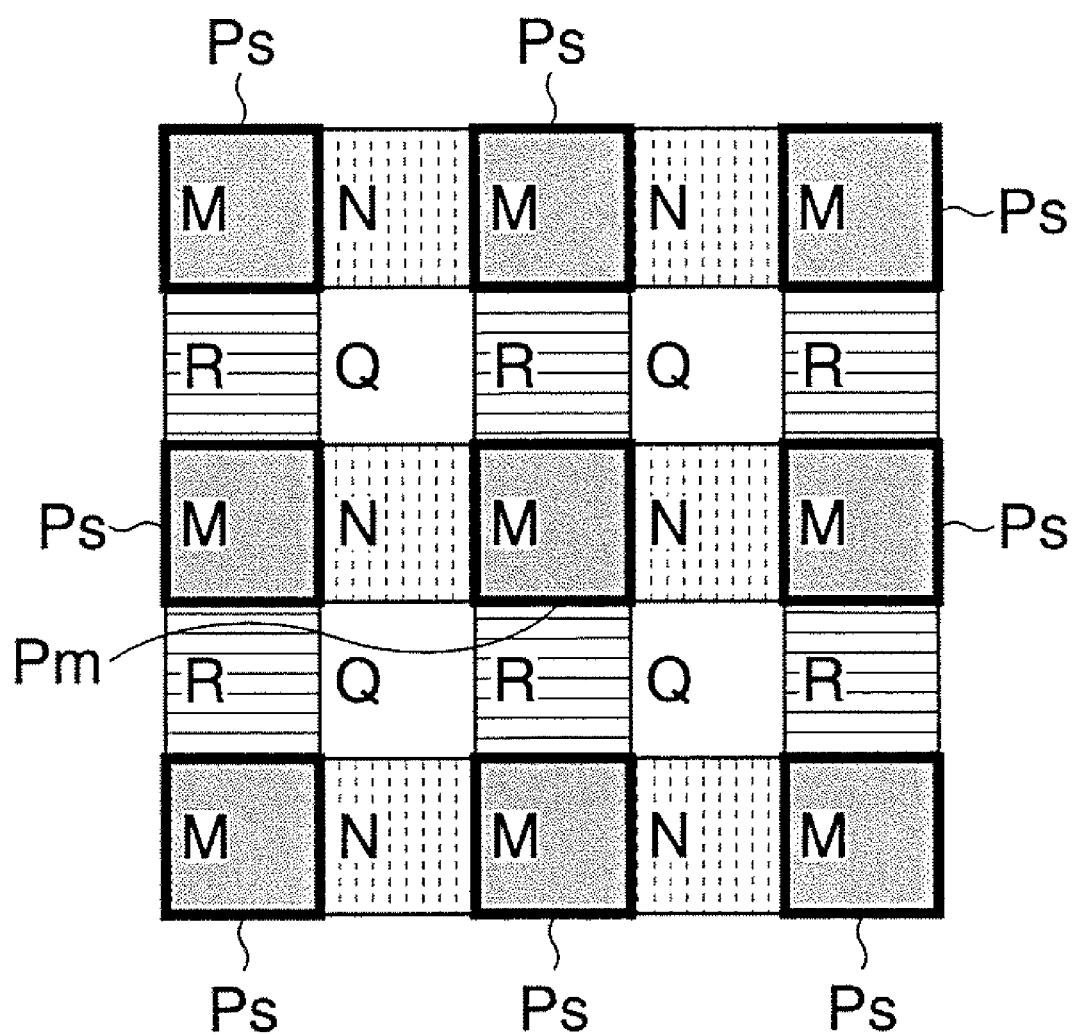
FIG. 19 is a schematic view showing a pixel-array pattern in the 5×5 matrix when the pixel arrangement is as in FIG. 18.

When the $1^{st}$ presumed correlating direction is detected, the pixel data of the "M" pixels is used as the pixel data of the first surrounding pixel Ps', as shown in FIG. 17. Namely, when the pixel data of the center pixel Pm is the pixel data $P_{ij}$, pixel data $P_{(i-2)(j-1)}$, $P_{(i-2)(j+1)}$, $P_{i(j-2)}$, $P_{i(j+2)}$, $P_{(i+2)(j-1)}$, $P_{(i+2)(j+1)}$ are used as the pixel data of the first surrounding pixels Ps'. Similarly, when the $2^{nd}$-$4^{th}$ presumed correlating directions are detected, the pixel data of the "M" pixel in FIGS. 17 (B), (C), and (D) is used as the pixel data of the surrounding pixels Ps", Ps''', and Ps''''.

The $1^{st}$-$4^{th}$ presumed correlating directions are input to the $1^{st}$-$4^{th}$ interpolation circuits 171-174, respectively. To the $1^{st}$-$4^{th}$ interpolation circuits 171-174, the raw image data and the sensor information are also input. At the $1^{st}$-$4^{th}$ interpolation circuits 171-174, the $1^{st}$-$4^{th}$ signal groups of presumed interpolation signals are generated by using the $1^{st}$-$4^{th}$ presumed correlating directions, the raw image data, and the $1^{st}$-$5^{th}$ coefficient matrices (operators) Y1-Y5 stored in the interpolation block 170, respectively. Further, when the $1^{st}$-$4^{th}$ signal groups of presumed interpolation signals are respectively generated, the "M", "N", "Q", and "R" pixels in FIG. 17 are presumed to have the same color, respectively.

The $1^{st}$-$4^{th}$ signal groups of presumed interpolation signals are input to the $1^{st}$-$4^{th}$ interpolation circuits 181-184 with $1^{st}$-$16^{th}$ type of pulse signals, respectively. At the $1^{st}$-$4^{th}$ interpolation circuits 181-184, one of the $1^{st}$-$4^{th}$ signal groups of presumed interpolation signals is selected as the signal groups of interpolation signals of the center pixel Pm, and each color of the interpolation signals m, n, q, and r is determined, based on the $1^{th}$-$16^{th}$ type of pulse signals.

As described above, when the number of pixel-array pattern is four, four circuits are used in each of the blocks 160, 170, and 180 in the signal processing block 125.

Figure 18:
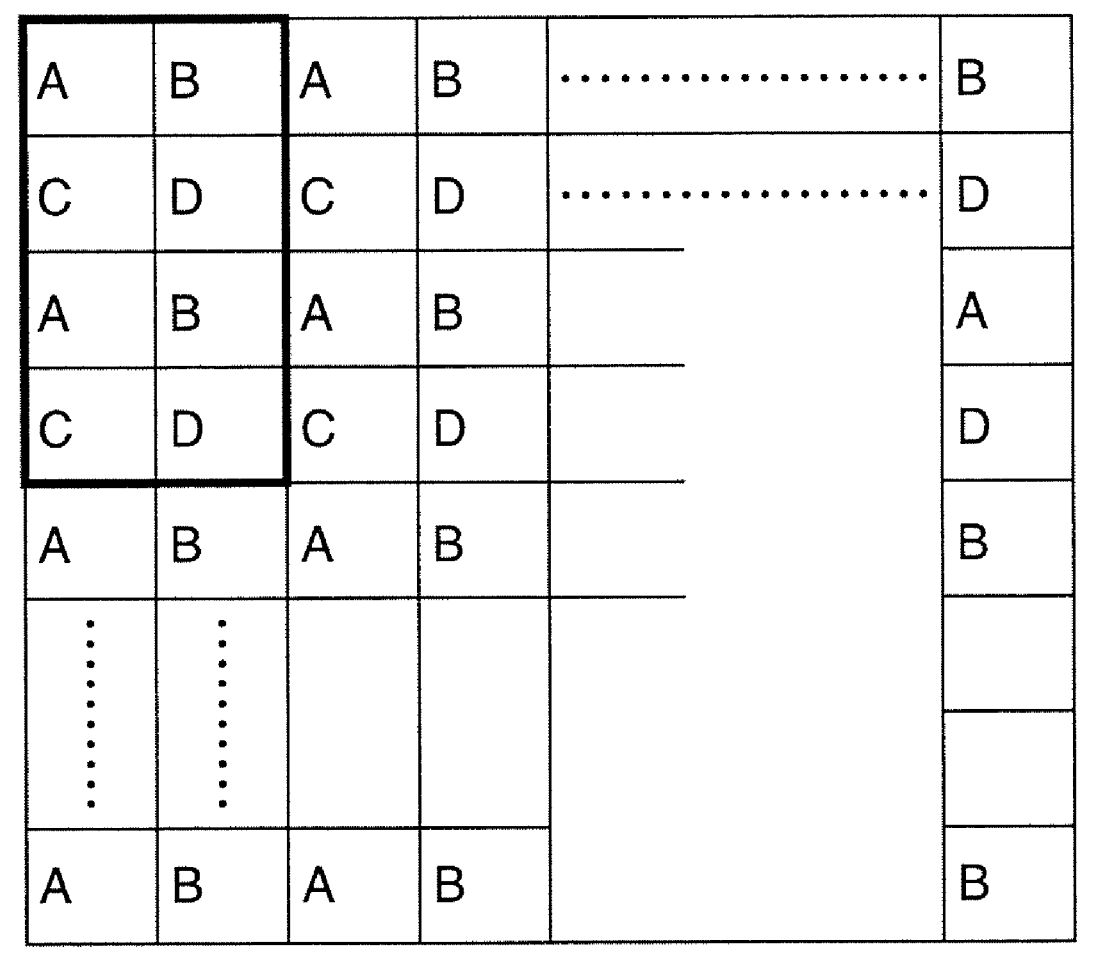

FIG. 18 shows an example of a solid-state imaging device having a different pixel arrangement from that in FIGS. 2 and 16. In the pixel arrangement in FIG. 18, "A" and "B" pixels alternate in all the odd rows, while "C" and "D" pixels alternate in all the even rows. In addition to this, "A" and "C" pixels are always in odd columns and "B" and "D" pixels are always in even columns. In this case, the number of the pixel-array patterns of the 5×5 pixel is only one; namely, only a first-array pattern exists.

Therefore, in the direction detection block 160, the presumed correlating direction is detected only at the first detection circuit 161, but it is not detected at the $2^{nd}$-$4^{th}$ detection circuits 162-164. Similarly, in the pixel interpolation block 170, only the first signal group of the presumed interpolation signals is generated at the first interpolation circuit 171 using the presumed correlating direction generated by the first detection circuit 161. Then, the first signal group of the presumed interpolation signals is selected as the signal group of interpolation signals of the center pixel Pm.

As described above, the signal group of interpolation signals can be obtained by the signal processing block 125 according to this embodiment, when the number of the pixel-array patterns of the 5×5 matrix is between one and four. Of course, if the number of the pixel-array patterns of the 5×5 matrix is greater than four, the interpolation signals of each center pixel can be obtained by increasing the number of circuits in each of the blocks 160, 170, and 180.

Figure 20:
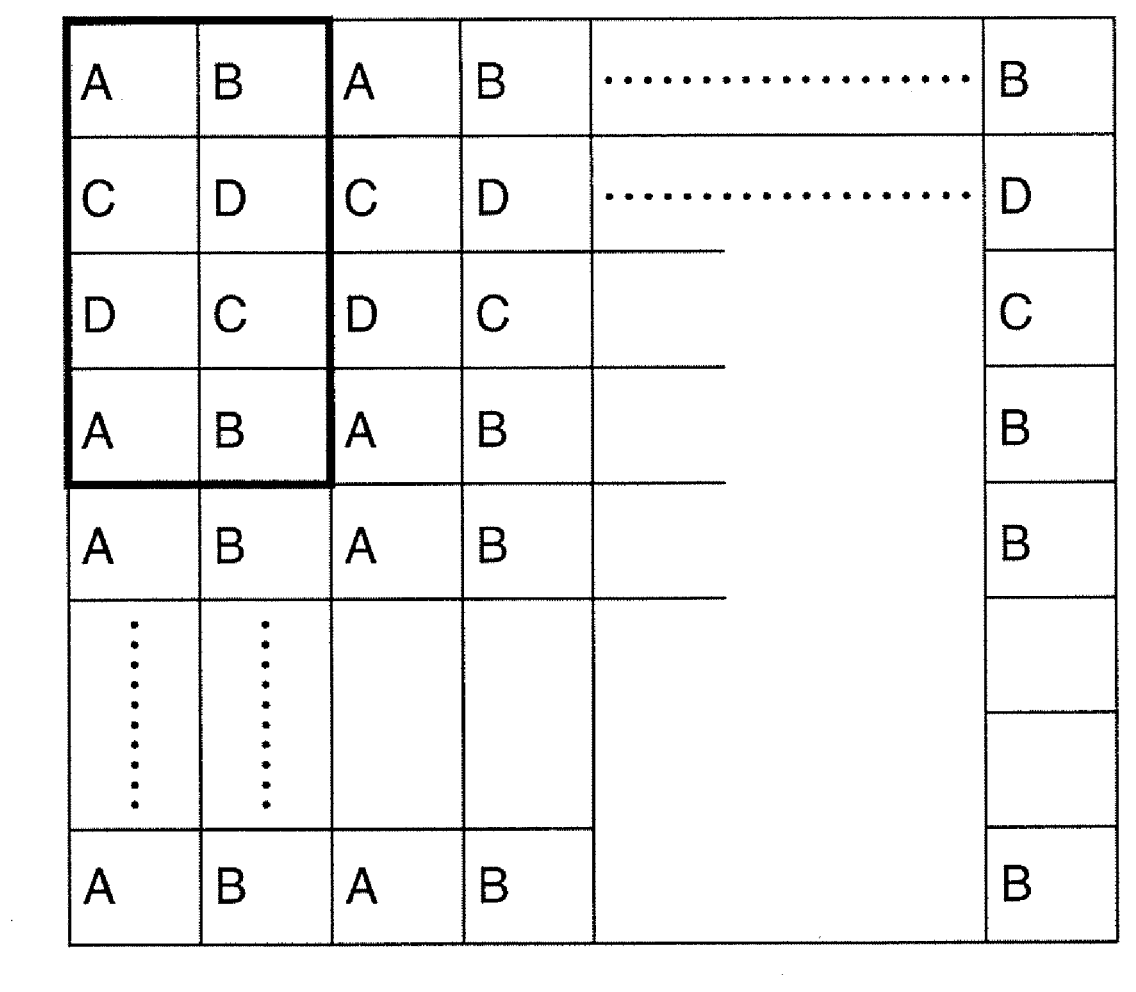
Figure 21:
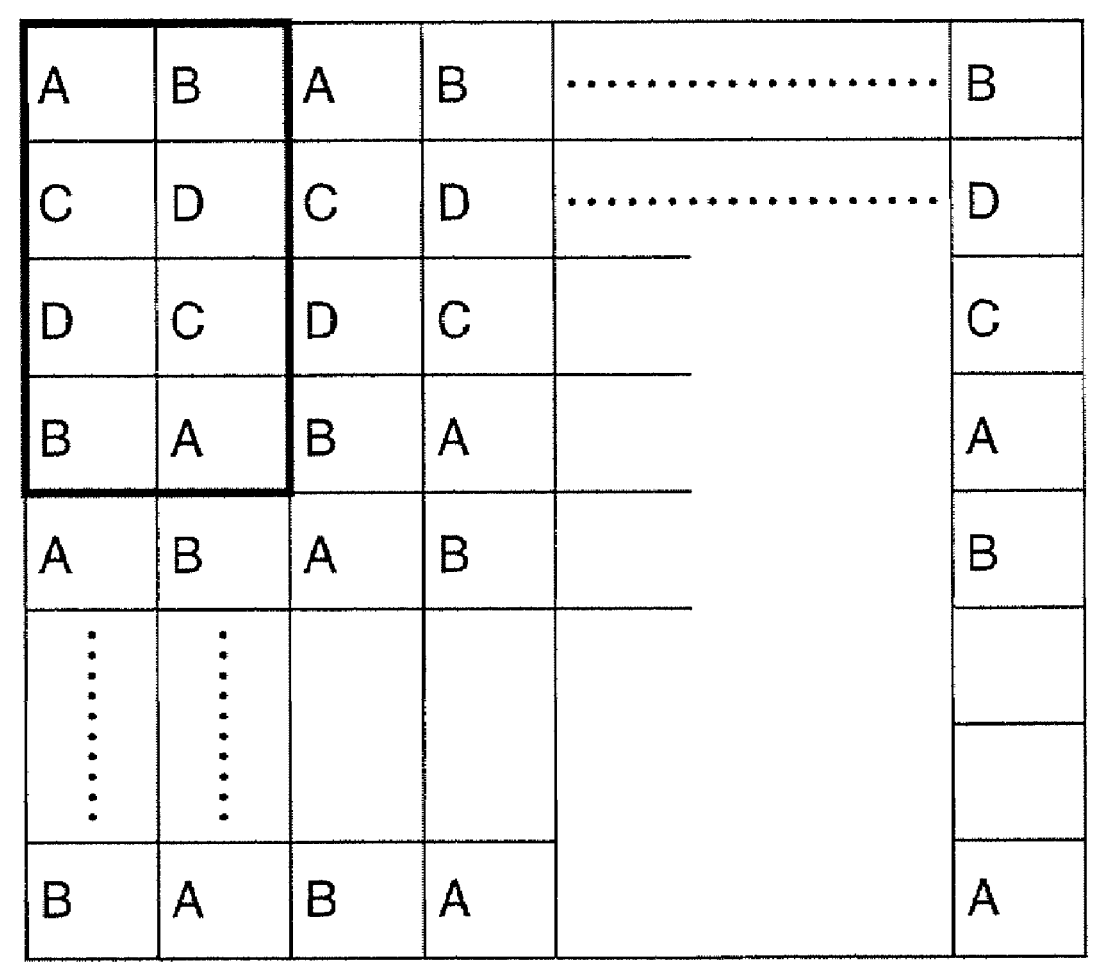

Another example of a pixel arrangement in the solid-state imaging device, having two pixel-array patterns of the 5×5 matrix, is shown in FIG. 20. Alternatively, another example of a pixel arrangement in the solid-state imaging device, having four pixel-arrays patterns of the 5×5 matrix, is shown in FIG. 21.

Figure 22:
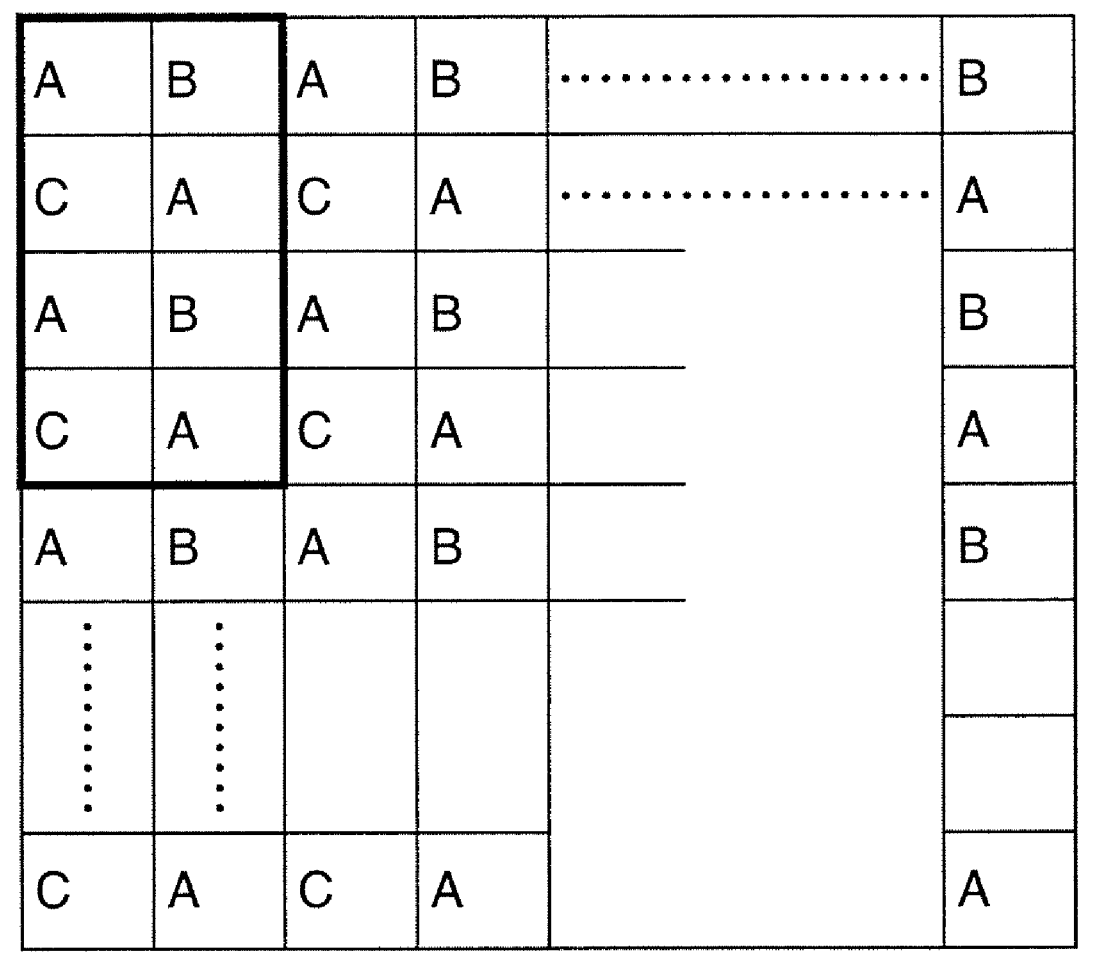

In this embodiment, the pixel arrangement of the solid-state imaging device is composed of four different color pixels, but, in general, the device may have three, five, or more than five different color pixels. An example of a pixel arrangement consisting of three different color pixels is shown in FIG. 22. This pixel arrangement is called a "Bayer array". In this arrangement, the pixel-array pattern of the 5×5 matrix is different when the center pixel is the pixel "A" from that when the center pixel is the pixel "B", or when the center pixel is the pixel "C".

Further, the matrix area Fm is a 5×5 matrix Fm in this embodiment. Of course, the matrix area Fm can also be a k×k matrix (where "k" is an odd natural number); for example a 3×3 matrix, a 7×7 matrix, or so on.

Furthermore, the pixel signal is independently scanned by the progressive scan when the pixel signals are read out, in this embodiment. However, the pixel signals of two pixels adjoining in the vertical direction can be simultaneously scanned and mixed when the pixel signals are read out.

Moreover, the pixel signals that undergo pixel interpolation are input to the pixel determination block 180 in this embodiment. However, the pixel signals that do not undergo pixel interpolation can also be input to the pixel determination block 180. In this case, the pixel-array pattern of the 5×5 matrix Fm for each center pixel Pm is determined at first. Next, the pixel interpolation and the detection of correlating direction are conducted using the determined pixel-array pattern. Due to these processes, it is not necessary to generate more than one signal group of the interpolation signals or more than one correlating direction if the pixel-array pattern has more than one patterns.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2005-353965 (filed on Dec. 7, 2005), which is expressly incorporated herein, by reference, in its entirety.

The invention claimed is:

1. An image signal processing device, for processing each pixel signal that is output from each pixel in a solid-state imaging device having a plurality of pixels, including at least first pixels having a first color, second pixels having a second color, and third pixels having a third color; said first, second, and third pixels being regularly arranged such that, when each of said pixels is defined as a center pixel of a k×k matrix, the pixels having a same color are arranged according to one of a plurality of pixel-array patterns including at least first- and second-array patterns in said k×k matrix, said device comprising:

an interpolation processor that includes at least a first interpolation portion and a second interpolation portion, said first interpolation portion presuming which pixels in said k×k matrix have the same color as said first, second, or third color according to said first-array pattern, and conducting pixel interpolation for each said center pixel so as to generate a first signal group including first, second, and third color presumed interpolation signals for each said center pixel from each pixel data of the presumed pixels having the same color as said first, second, or third color, according to said first-array pattern, said second interpolation portion presuming which pixels in said k×k matrix have the same color as said first, second, or third color according to said second-array pattern, and conducting pixel interpolation for each said center pixel so as to generate a second signal group including first, second, and third color presumed interpolation signals for each said center pixel from each of pixel data of the presumed pixels having the same color as said first, second, or third color, according to said second-array pattern, a determination processor that determines a pixel-array pattern in said k×k matrix to be a pattern selected from said plurality of pixel-array patterns, one of said signal groups generated in the case of presumed color arrangement according to said determined pixel-array pattern being selected as a signal group of interpolation signals for said center pixel, said determination processor selecting said first signal group as the signal group of interpolation signals for said center pixel when the pixel-array pattern of said k×k matrix is determined to be said first-array pattern, and selecting said second signal group as the signal group of interpolation signals when the pixel-array pattern of said k×k matrix is determined to be said second-array pattern.

2. A device according to claim 1, wherein said first, second, and third color presumed interpolation signals are each generated from the pixel data of the pixels that are presumed to have the first, second, or third color, respectively, in said k×k matrix.

3. A device according to claim 1, wherein said interpolation processor calculates weighted or arithmetic averages of the pixel data of the pixels in said k×k matrix, said pixels being presumed to have the same color as one another for each color so as to generate each color signal of said presumed interpolation signals.

4. A device according to claim 1, wherein said plurality of pixels are arrayed into an m×n matrix composed of a plurality of basic matrices that are arranged in a row direction and in a column direction, each said basic matrix having an identical pixel-arrangement, and said determination processor determines said determined pixel-array patterns according to a position of said basic matrix in which said center pixel is located.

5. A device according to claim 1, comprising:
a direction detection processor that detects a correlating direction, so that pixel data of surrounding pixels that surround each said center pixel, and that are arranged along said correlating direction are closer in value to pixel data of each said center pixel than are pixel data of said surrounding pixels that surround each said center pixel and that are arranged along other directions,
wherein said interpolation processor conducts said pixel interpolation by using pixel data of pixels that are arranged along said correlating direction in said k×k matrix.

6. A device according to claim 5, wherein said surrounding pixels have the same color as the color of each said center pixel.

7. A device according to claim 1, comprising:
a direction detection processor that includes first and second detection portions,
wherein said first detection portion determines first surrounding pixels that are presumed to have the same color as said center pixel according to said first-array pattern and that surround said center pixel, and detects a first presumed correlating direction, so that pixel data of said first surrounding pixels that are arranged along said first presumed correlating direction are closer in value to pixel data of said center pixel than are pixel data of said first surrounding pixels that are arranged along other directions, and
said second detection portion determines second surrounding pixels that are presumed to have the same color as said center pixel according to said second-array pattern and that surround said center pixel, and detects a second presumed correlating direction, so that pixel data of said second surrounding pixels that are arranged along said second presumed correlating direction are closer in value to pixel data of said center pixel than are pixel data of said second surrounding pixels that are arranged along other directions,
said first interpolation portion conducts a pixel interpolation using pixel data of the pixels that are arranged along said first presumed correlating direction, and
said second interpolation portion conducts a pixel interpolation using pixel data of the pixels that are arranged along said second presumed correlating direction.

8. A device according to claim 7, wherein said plurality of pixels are arrayed into an m×n matrix that is composed of a plurality of basic matrices arranged in a row direction and in a column direction, each said basic matrix having an identical pixel-arrangement, and
said determination processor determines said signal group of interpolation signals of said center pixel which are selected from said first and second signal groups according to a position of said basic matrix in which said center pixel is located.

9. A device according to claim 8, wherein said determination processor determines said first, second, and third colors of said interpolation signals of said center pixel according to a position of said basic matrix in which said center pixel is located.

10. A device according to claim 8, wherein said determination processor includes at least first and second determination portions, said first and second signal groups for the same center pixel being input to said first and second determination portions, respectively, at the same time,
a pulse signal is input to one of said first and second determination portions at said same time, and
one of said first and second determination portions selects one group of said first and second signal groups as said signal group of interpolation signals of said center pixel when said pulse signal is input to said one of said first and second determination portions.

11. A device according to claim 10, wherein said pulse signal is synchronously input to said first determination portion with the input of said first and second signal groups of presumed interpolation signals of the same center pixel of said k×k matrix having said first-array pattern, and
said pulse signal is synchronously input to said second determination portion with the input of said first and second signal group of presumed interpolation signals of the same center pixel of said k×k matrix having said second-array pattern.

12. A device according to claim 10, wherein said plurality of pixels are arrayed into an m×n matrix that has a plurality of basic matrices arranged in a row direction and in a column direction, each said basic matrix having an identical pixel-arrangement, a determination portion to which said pulse signal is input being determined according to a position of said basic matrix in which said center pixel is located.

13. A device according to claim 10, wherein said plurality of pixels are arrayed into an m×n matrix that has a plurality of basic matrices arranged in a row direction and in a column direction, each said basic matrix having an identical pixel-arrangement,
each said pulse signal that is input at each said same time is a different type from the others according to a position of said basic matrix in which each said center pixel is located, and
a color of said interpolation signals is determined according to said type of said pulse signal.

14. A device according to claim 1, wherein said plurality of pixels are arrayed into an m×n matrix that has a plurality of basic matrices arranged in a row direction and in a column direction, each said basic matrix having an identical pixel-arrangement, and
said interpolation processor determines each color of said interpolation signals of said center pixel according to a position of said basic matrix in which said center pixel is located.

15. A device according to claim 1, said plurality of pixels being arrayed into an m×n matrix, wherein when said center pixel is located on an odd row of said m×n matrix, said pixel-array of said k×k pixel matrix is said first-array pattern; and when said center pixel is located on a even row of said m×n matrix, said pixel-array of said k×k pixel matrix is said second-array pattern; and
said determination processor determines said first signal group to be said signal group of interpolation signals of said center pixel when said center pixel is located on said odd row, and determines said second signal group to be said signal group of interpolation signals of said center pixel when said center pixel is located on said even row.

16. A device according to claim 1, wherein said interpolation processor presumes which pixels have the same color as one another in said k×k matrix according to said determined pixel-array pattern, and conducts a pixel interpolation in a case of presumed color arrangement according to said determined pixel-array patterns, so as to generate a signal group including, at least, first, second, and third color presumed interpolation signals for said center pixel, said generated signal group being determined to be a signal group of interpolation signals for said center pixel.

17. An image signal processing device, for processing each pixel signal that is output from each pixel in a solid-state imaging device having a plurality of pixels, including at least first pixels having a first color, second pixels having a second color, and third pixels having a third color; said first, second, and third pixels being regularly arranged such that, when each of said pixels is defined as a center pixel of a k×k matrix, the pixels having a same color are arranged according to one of a plurality of pixel-array patterns including at least first- and second-array patterns in said k×k matrix, said device comprising:

a direction detection processor that presumes which pixels have the same color as that of said center color pixel in said k×k matrix according to at least one of said plurality of pixel-array patterns, and that detects at least one presumed correlating direction using the pixels presumed to have the same color as said center pixel in each case of said at least one of said plurality of pixel-array patterns, so that pixel data of said presumed pixels that are arranged along said presumed correlating direction are closer in value to pixel data of said center pixels than are pixel data of said presumed pixels that are arranged along other directions;

a first interpolator that presumes which pixels in said k×k matrix have the same color as said first, second, or third color according to said first-array pattern, and conducts pixel interpolation for each said center pixel so as to generate a first signal group including first, second, and third color presumed interpolation signals for each said center pixel from each pixel data of the presumed pixels having the same color as said first, second, or third color, according to said first-array pattern, a second interpolator that presumes which pixels in said k×k matrix have the same color as said first, second, or third color according to said second-array pattern, and conducts pixel interpolation for each said center pixel so as to generate a second signal group including first, second, and third color presumed interpolation signals for each said center pixel from each of pixel data of the presumed pixels having the same color as said first, second, or third color, according to said second-array pattern, said first and second interpolators conducting said pixel interpolation by using pixel data of pixels that are arranged along said presumed correlating direction detected by said direction detection processor; and a determination processor that determines a pixel-array pattern in said k×k matrix to be a pattern selected from said plurality of pixel-array patterns, one of said presumed correlating directions detected, according to said determined pixel-array pattern, being selected as a correlating direction of said center pixel and that selects said first signal group as the signal group of interpolation signals for said center pixel when the pixel-array pattern of said k×k matrix is determined to be said first-array pattern, and selecting said second signal group as the signal group of interpolation signals when the pixel-array pattern of said k×k matrix is determined to be said second-array pattern.

18. An image signal processing method, for processing each pixel signal that is output from each pixel in a solid-state imaging device having a plurality of pixels, including at least first pixels having a first color, second pixels having a second color, and third pixels having a third color, said first, second, and third pixels being regularly arranged such that, when each of said pixels is defined as a center pixel of a k×k matrix, the pixels having a same color are arranged according to a one of a plurality of pixel-array patterns, including at least first- and second-array patterns in said k×k matrix, said method comprising:

presuming, by a first presuming, which pixels in the k×k matrix have the same color as said first, second, or third color according to said first-array pattern, and conducting pixel interpolation for each center pixel so as to generate a first signal group including first, second, and third color presumed interpolation signals for each said center pixel from each of pixel data of the presumed pixels having the same color as first, second, or third color, according to the first-array pattern, and presuming, by a second presuming, which pixels in the k×k matrix have the same color as the first, second, or third color according to the second-array pattern, and conducting pixel interpolation for each center pixel so as to generate a second signal group including first, second, and third color presumed interpolation signals for each center pixel from each of pixel data of the presumed pixels having the same color as the first, second, or third color, according to the second-array pattern, determining a pixel-array pattern in the k×k matrix to be a pattern selected from the plurality of pixel-array patterns; and selecting, by a signal processor, one of the signal groups generated in the case of presumed color arrangement according to the determined pixel-array pattern as a signal group of interpolation signals for the center pixel, the selecting comprising selecting the first signal group as the signal group of interpolation signals for the center pixel when the pixel-array pattern of said k×k matrix is determined to be the first-array pattern, and selecting the second signal group as the signal group of interpolation signals for the center pixel when the pixel-array pattern of the k×k matrix is determined to be the second-array pattern.

19. An image signal processing method, for processing each pixel signal that is output from each pixel in a solid-state imaging device having of a plurality of pixels including at least first pixels having a first color, second pixels having a second color, and third pixels having a third color, said first, second, and third pixels being regularly arranged such that, when each of said pixels is defined as a center pixel of a k×k matrix, the pixels having a same color are arranged according to a one of a plurality of pixel-array patterns including at least first- and second-array patterns in said k×k matrix, said method comprising, presuming, by a first presuming, which pixels in the k×k matrix have the same color as said first, second, or third color according to said first-array pattern, and conducting pixel interpolation for each center pixel so as to generate a first signal group including first, second, and third color presumed interpolation signals for each said center pixel from each of pixel data of the presumed pixels having the same color as first, second, or third color, according to the first-array pattern, and presuming, by a second presuming, which pixels in the k×k matrix have the same color as the first, second, or third color according to the second-array pattern, and conducting pixel interpolation for each center pixel so as to generate a second signal group including first, second, and third color presumed interpolation signals for each center pixel from each of pixel data of the presumed pixels having the same color as the first, second, or third color, according to the second-array pattern, detecting at least one presumed correlating direction using the pixels presumed to have the same color as the color of the center pixel in each case of the at least one of said plurality of pixel-array patterns, so that pixel data of the presumed pixels that are arranged along the correlating direction are closer in value to pixel data of the center pixels than are pixel data of the presumed pixels that are arranged along other directions, wherein the first presuming and the second presuming conduct the pixel interpolation by using the pixel data of pixels that are arranged along the detected presumed correlating direction determining a pixel-array pattern in the k×k matrix to be a pattern selected from the plurality of pixel-array patterns; and selecting, by a signal processor, one of the presumed correlating directions detected, according to the determined pixel-array pattern, as a correlating direction of the center pixel;

the selecting comprising selecting the first signal group as the signal group of interpolation signals for the center pixel when the pixel-array pattern of said k×k matrix is determined to be the first-array pattern, and selecting the second signal group as the signal group of interpolation signals for the center pixel when the pixel-array pattern of the k×k matrix is determined to be the second-array pattern.

* * * * *